United States Patent

Bohen et al.

[11] Patent Number: 5,070,124
[45] Date of Patent: Dec. 3, 1991

[54] SULFIDE ANTIOXIDANTS FOR STABILIZING CROSSLINKED POLYOLEFINS

[75] Inventors: Joseph M. Bohen, King of Prussia; James L. Reilly, Towamencin, both of Pa.

[73] Assignee: Atochem North America, Inc., Philadelphia, Pa.

[21] Appl. No.: 429,899

[22] Filed: Oct. 31, 1989

[51] Int. Cl.$^5$ .......................... C08K 5/524; C08K 5/36
[52] U.S. Cl. ...................... 524/151; 524/255; 524/291; 524/368; 524/377; 524/376; 524/392
[58] Field of Search ................ 525/345, 350; 524/377, 524/376, 368, 392, 151, 255, 291

[56] References Cited

U.S. PATENT DOCUMENTS

| | | | |
|---|---|---|---|
| 2,522,590 | 9/1950 | Vaughan | 204/158 |
| 2,995,539 | 8/1961 | Barker et al. | 260/45.5 |
| 3,180,850 | 4/1965 | Schooten et al. | 524/324 |
| 3,214,422 | 10/1965 | Mageli et al. | 260/94.9 |
| 3,223,738 | 12/1965 | Crain et al. | 260/609 |
| 3,258,493 | 6/1966 | Braus et al. | 568/57 |
| 3,293,209 | 12/1966 | Baldwin et al. | 524/333 |
| 3,301,816 | 1/1967 | Burgess | 260/45.95 |
| 3,361,713 | 1/1968 | Meyer | 525/345 |
| 3,574,165 | 4/1971 | Braus et al. | 524/326 |
| 3,652,680 | 3/1972 | Buchholz | 524/326 |
| 3,772,246 | 11/1973 | Buchholz | 524/392 |
| 3,773,556 | 11/1973 | Rowland et al. | 525/387 |
| 3,876,613 | 4/1975 | Needham et al. | 524/289 |
| 4,028,332 | 6/1977 | Needham et al. | 524/303 |
| 4,221,699 | 9/1980 | Arnaud et al. | 524/333 |
| 4,514,539 | 4/1985 | Hattrich et al. | 524/436 |
| 4,526,916 | 7/1985 | White | 524/130 |
| 4,833,209 | 5/1989 | Beijleveld et al. | 525/837 |

FOREIGN PATENT DOCUMENTS

| | | |
|---|---|---|
| 0177784 | 4/1986 | European Pat. Off. |
| 1265409 | 4/1968 | Fed. Rep. of Germany |
| 1694210 | 4/1971 | Fed. Rep. of Germany |
| 966929 | 8/1964 | United Kingdom |
| 981346 | 1/1965 | United Kingdom |
| 1015797 | 1/1966 | United Kingdom |

OTHER PUBLICATIONS

J. R. Shelton Organic Sulfur Compounds as Preventive Antioxidants *Developments in Polymer Stabilization*—4 pp. 23–29, Gerald Scott, ed. (1981).
Paper presented at the "ANTEC 88 Conference", Apr. 18–21, 1988 entitled "New Concepts in Sulfide Antioxidant Synergists" by D. Braksmayer, Pennwalt Corp., Performance Chemicals Dept.
"The Accelerated Decomposition of Benzoyl Peroxide in the Presence of Sulfides and Disulfides" by William A. Pryor and H. T. Bickley, *J. Org. Chem.*, vol. 37, No. 18 (1972), pp. 2885–2892.
"Synergism Between Phenols and Sulfides in the Stabilization of Polyolefins to Oxidation" by Norman P. Neureiter and D. E. Bown *I.E.C. Prod. Res. & Dev.*, vol. 1, No. 4, pp. 236–241 (1962).
U.S. Defensive Publication No. T985004-Paul published 8/79.
The Condensed Chemical Dictionary, 10th Edition, p. 287 (1981).
The Encyclopedia of Polymer Science and Engineering, 2nd Edition, vol. 4, p. 385 (1986).
The Encyclopedia of Polymer Science and Engineering, 2nd Edition, vol. 4, pp. 418–449 (1986).

*Primary Examiner*—Veronica P. Hoke
*Attorney, Agent, or Firm*—Panitch Schwarze Jacobs & Nadel

[57] ABSTRACT

The present invention is a composition comprising crosslinked polyolefin resins and an amount of organic sulfide antioxidants sufficient to stabilize the resin against thermal or oxidative degradation, wherein the organic sulfide antioxidant is represented by Formula I, II or III

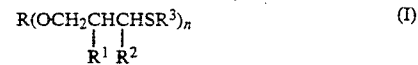

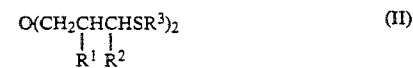

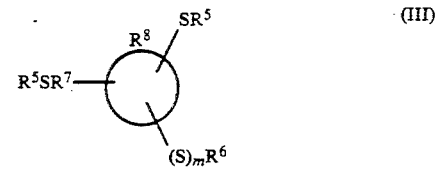

wherein m, n, R, $R^1$, $R^2$, $R^3$, $R^5$, $R^6$, $R^7$ and $R^8$ are as set forth in the Summary of the Invention.

31 Claims, No Drawings

SULFIDE ANTIOXIDANTS FOR STABILIZING CROSSLINKED POLYOLEFINS

FIELD OF THE INVENTION

The present invention relates to stabilized crosslinked polyolefin resin compositions.

BACKGROUND OF THE INVENTION

The use of sulfide-type antioxidants as stabilizers in polyolefin resin compositions is known in the art.

For example, the use of diesters of thiodipropionic acid, such as the dilauryl, dimyristyl and distearyl esters of the thiodipropionic acid, as well as thiodipropionic acid itself, as antioxidants in crosslinked polyolefins is known in the art. For example, U.S. Pat. Nos. 3,876,613 and 4,028,332 disclose the use of such diesters of thiodipropionic acid in producing useful molded articles from peroxide-induced crosslinked polyethylene homopolymers and copolymers. The resultant crosslinked copolymers have high impact strength and a high resistance to stress cracking.

Likewise, U.S. Pat. No. 4,514,539 teaches the use of thiodipropionic esters as antioxidants in resin systems which comprise a combination of ethylene-vinyl acetate copolymers and polyethylene. The resin systems are crosslinked with peroxides. U.S. Pat. No. 4,526,916 discloses the use of thiodipropionate esters as antioxidants in peroxide-induced crosslinked polyethylene compositions, which are capable of being used in rotational molding processes.

U.S. Pat. No. 4,221,699 teaches the use of thio-bisphenols as antioxidants in polyolefin compositions which are also crosslinked with peroxides.

The crosslinking of polymer compositions has the effect of changing a plastic from a thermoplastic material to thermosetting material. This change has the effect of increasing the strength, heat and electrical resistance of the plastic, in addition to increasing its resistance to solvents, chemicals, creep and stress cracking. (See, e.g., *The Condensed Chemical Dictionary*, 10th Ed., p. 287 (1981)). Furthermore, the crosslinking of polymer compositions extends the useful upper temperature limit of the polymer as well as improves the heat-shrinking properties of the polymer, discussed in *The Encyclopedia of Polymer Science and Engineering*, 2nd Ed., Vol. 4, p. 385 (1986). The types of polymers which can be crosslinked in order to cause an increase in their mechanical properties are known to those skilled in the art and are discussed in numerous references, such as, e.g., *The Encyclopedia of Polymer Science and Engineering*, 2nd Ed. Vol. 4, pp. 418-449 (1986).

Crosslinked polyolefin resin compositions are useful in a wide variety of applications. For example, crosslinked polyolefin compositions are useful as wire and cable coatings, insulation, pipe and molded fittings, and rotational molded articles, such as gasoline tanks, barrels, containers, storage tanks, etc.

As indicated above, the use of organic sulfides as antioxidants in polyolefin resin compositions is known in the art. Particularly, the sulfide antioxidants are conventionally used in combination with various phenolic and arylamine auxiliary antioxidants to stabilize polyolefin resin compositions against the damaging effects of thermal and oxidative degradation both during processing and aging. For example, the use of organic sulfides as stabilizers in polyolefin resin compositions is taught in U.S. Pat. Nos. 3,180,850, 3,258,493, 3,293,209, 3,574,165, 3,652,680 and 3,772,246. However, conventional antioxidants have demonstrated certain drawbacks when used in polyolefin resins which are crosslinked.

Polyolefin resin compositions may generally be crosslinked through the use of (1) peroxide crosslinking agents or (2) high energy radiation. For polyolefin resin compositions crosslinked with peroxide, the range of useful antioxidants is limited, since the antioxidant itself must be compatible with the peroxide crosslinking agent, as discussed in U.S. Pat. No. 4,028,332. As further discussed in this patent, the thiodipropionate ester antioxidants, such as dilauryl thiodipropionate (DLTDP), are peroxide-compatible and provide a good low temperature impact strength, at least in polyolefin resins. However, these thiodipropionate ester antioxidants suffer several drawbacks. Namely, the antioxidant causes the resultant polymer compositions to discolor and to display an unpleasant odor.

Likewise, when high energy radiation is employed to induce crosslinking in the polyolefin resin compositions, the same criteria set forth above for the peroxide-induced crosslinked polymer compositions holds true. Similarly, conventional antioxidants used with polymer composition crosslinked with high energy radiation may cause the polymer compositions to discolor and have an unpleasant odor. The antioxidants used in these types of crosslinked polyolefin resins must be stable in the presence of the high energy radiation while providing its stabilizing effects.

Accordingly, one of the objects of the present invention is to provide crosslinked polymer compositions stabilized with organic sulfide antioxidants which are stable to the effects of heat and oxygen, and provide stabilized resin compositions which are hydrolytically stable, odor-free and color stable.

SUMMARY OF THE INVENTION

The present invention is a composition comprising crosslinked polyolefin resins and an amount of organic sulfide antioxidants sufficient to stabilize the resin against thermal or oxidative degradation, wherein the organic sulfide antioxidant is represented by Formula I, II or III

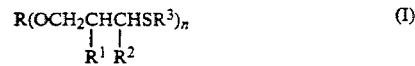

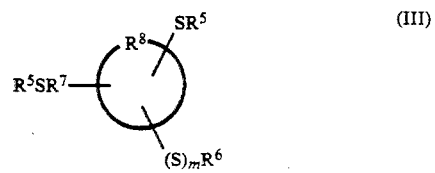

wherein:

m is 0 or 1;

n is an integer of 2 to 15;

R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alkyl group of 1 to 30 carbons or cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is an alkyl group of 1 to 24 carbons;

R$^7$ is a direct bond or an alkylene group of 1 to 4 carbons; and

R$^8$ is a monocyclic, bicyclic or tricyclic cycloalkyl group of 5 to 16 carbons.

DETAILED DESCRIPTION OF THE PREFERRED EMBODIMENTS

The present compositions comprise a crosslinked polyolefin resin and an organic sulfide antioxidant in an amount sufficient to provide antioxidant and thermal stabilizing effects. The present organic sulfide antioxidants stabilize the resins to the effects of oxygen and high temperature, while not interfering with the crosslinking process. The present organic sulfide antioxidants are represented by Formula I, II or III set forth below:

$$R(OCH_2CHCHSR^3)_n \quad \text{(I)}$$
$$\quad\quad\quad R^1 \; R^2$$

$$O(CH_2CHCHSR^3)_2 \quad \text{(II)}$$
$$\quad\quad R^1 \; R^2$$

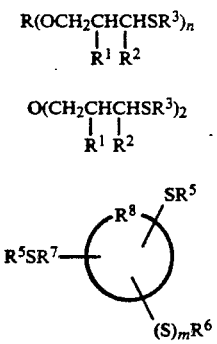
(III)

wherein:
m is 0 or 1;
n is an integer of 2 to 15;
R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be-separated from each other and from the portion of the compound to which the R group is bonded by at least one carbon atom, the substituents for R being —OH, —SR$^4$ or —OR$^4$, wherein R$^4$ is an alkyl group of 1 to 30 carbons or cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is an alkyl group of 1 to 24 carbons:

R$^7$ is a direct bond or an alkylene group of 1 to 4 carbons; and

R$^8$ is a monocyclic, bicyclic or tricyclic cycloalkyl group of 5 to 1 6 carbons.

Preferably, the organic sulfides of the present invention are those represented by Formulas I or II, wherein R is selected from the group consisting of

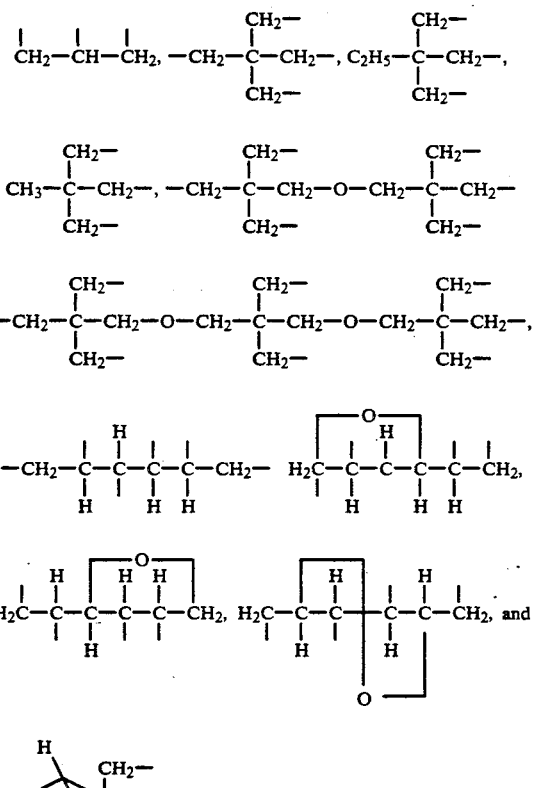

wherein α and β are the types of linkages; wherein
R$^1$ is H or —CH$_3$;
R$^2$ is H; and
R$^3$ is an alkyl group of 10 to 18 carbons.

More preferably, the organic sulfide antioxidants useful in the present composition are represented by Formula I or II, wherein R is represented by

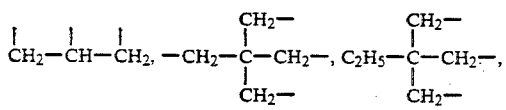
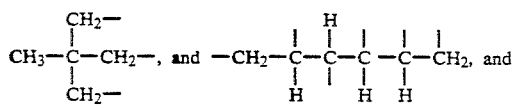

wherein
$R^1$ and $R^2$ are H; and
$R^3$ is an alkyl group of 12 to 18 carbons.

In the above-identified preferred and more preferred compounds, n is determined by the number of unattached bonds present in each R group.

The preferred organic sulfide antioxidants represented by Formula III are represented by one of the following structures:

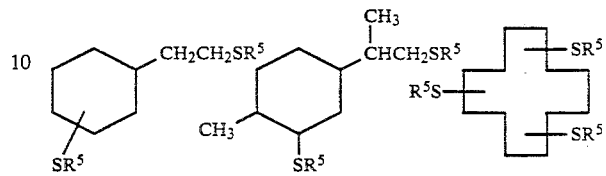

Non-limiting examples of representative organic sulfide antioxidants which are useful in the present composition are set forth below:

$$C_{18}H_{37}SCH_2CH_2CH_2O(CH_2CH_2O)_6CH_2CH_2OCH_2CH_2CH_2SC_{18}H_{37}$$
$$C_{16}H_{33}SCH_2CH_2CH_2O(CH_2CH_2SCH_2CH_2O)_2CH_2CH_2SCH_2CH_2OCH_2CH_2CH_2SC_{16}H_{33}$$

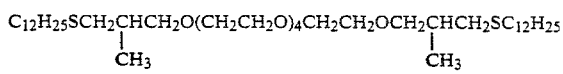

$$C_{14}H_{29}SCH_2CH_2CH_2OCH_2CH_2OCH_2CH_2OCH_2CH_2SCH_2CH_2OCH_2CH_2CH_2SC_{14}H_{29}$$

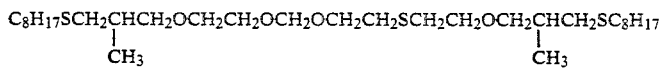

$$C_{13}H_{27}SCH_2CH_2CH_2O(CH_2CH_2CH_2CH_2O)_4CH_2CH_2CH_2CH_2OCH_2CH_2CH_2SC_{13}H_{27}$$

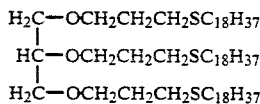
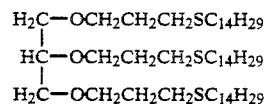

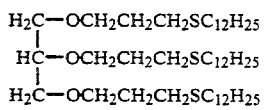
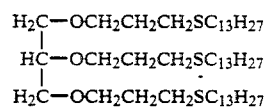

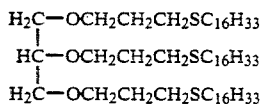
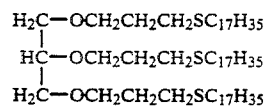

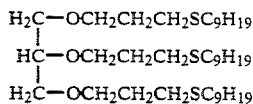
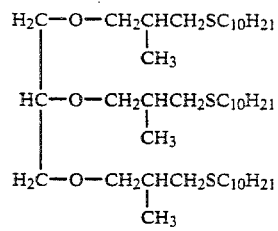

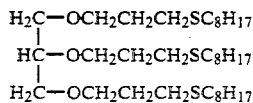
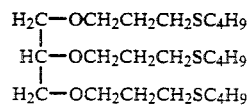

-continued
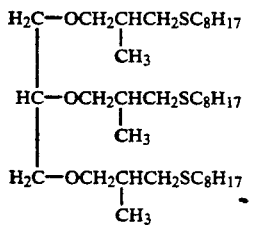
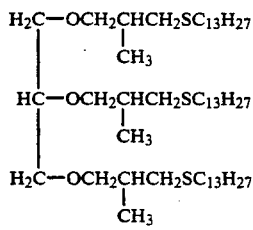
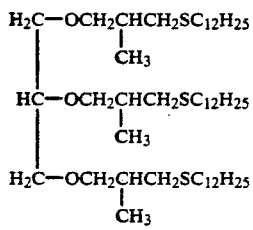
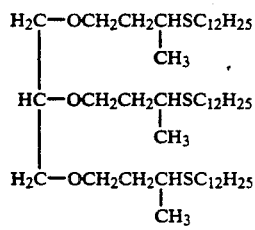
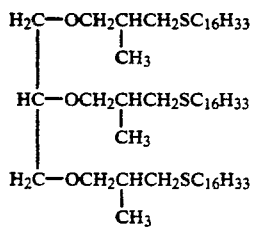
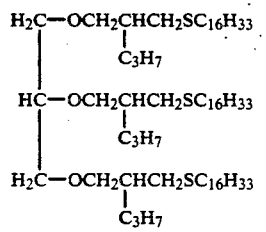
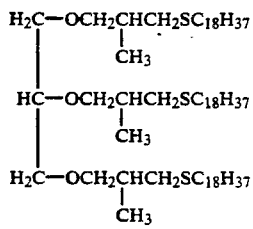
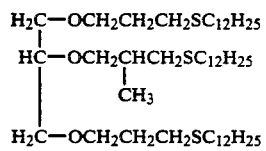
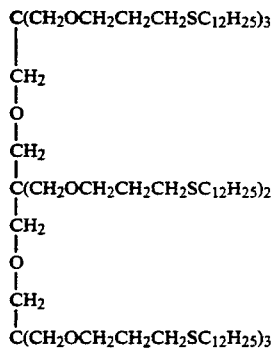
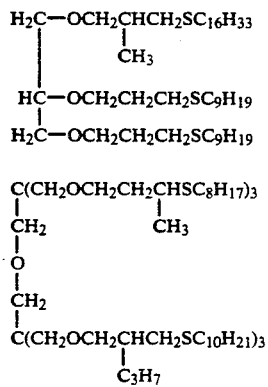

-continued
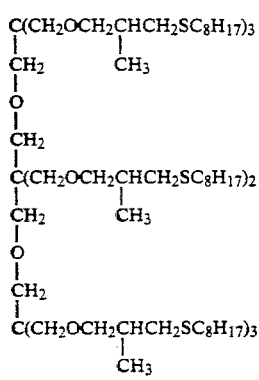
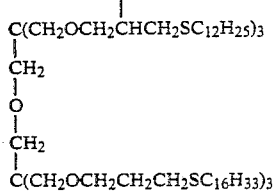
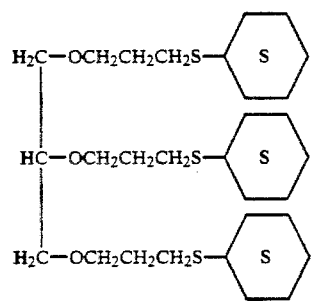
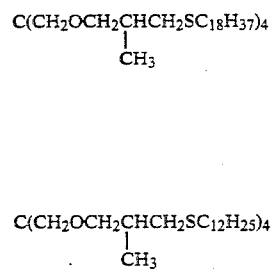
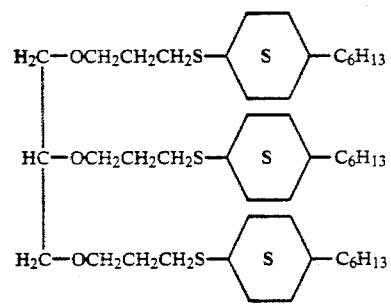
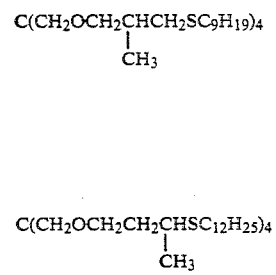
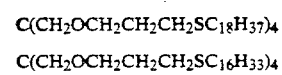
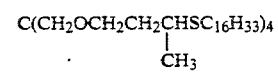
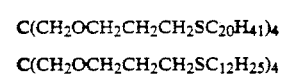
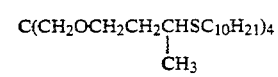
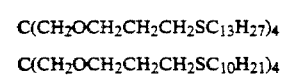
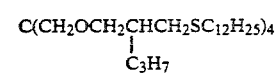
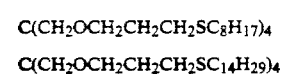
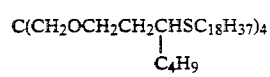
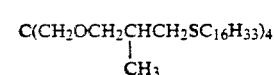
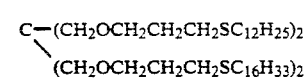
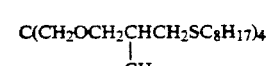
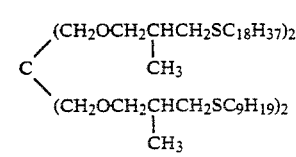
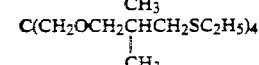

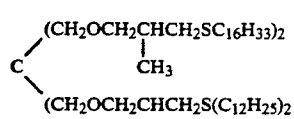
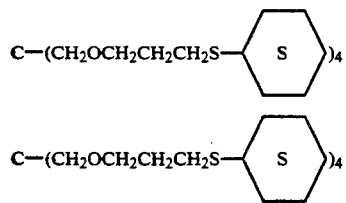
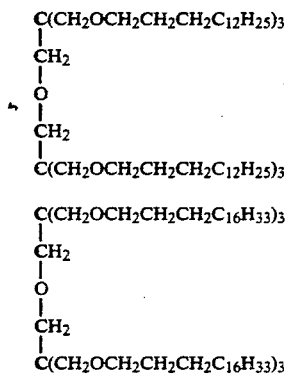
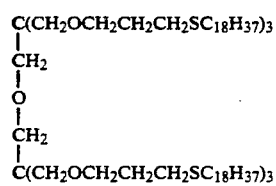
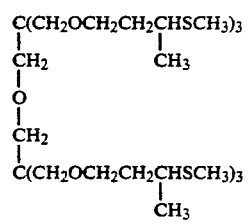
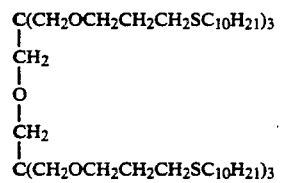
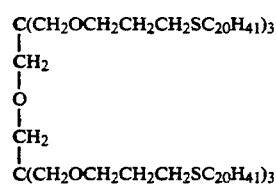
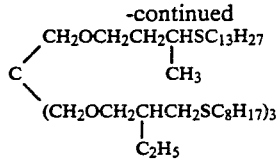
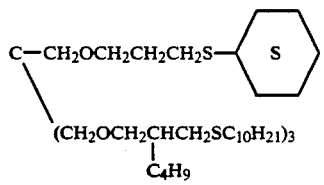
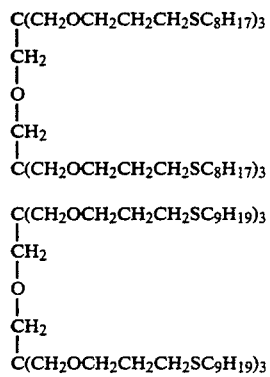
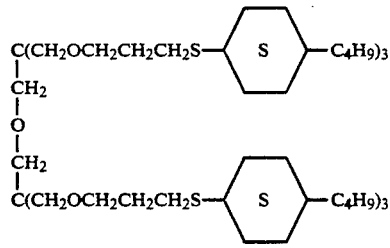
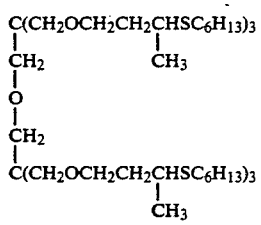
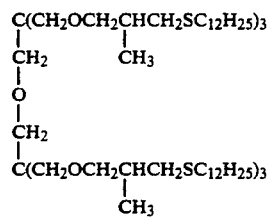
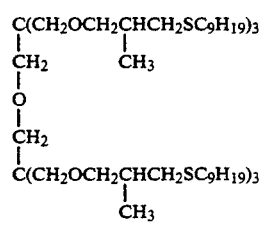

-continued

C(CH₂OCH₂CH₂CH₂SC₁₃H₂₇)₃
|
CH₂
|
O
|
CH₂
|
C(CH₂OCH₂CH₂CH₂SC₁₃H₂₇)₃

C(CH₂OCH₂CHCH₂SC₁₆H₃₃)₃
|      |
CH₂    CH₃
|
O
|
CH₂
|
C(CH₂OCH₂CHCH₂SC₁₆H₃₃)₃
              |
              CH₃

C(CH₂OCH₂CH₂CH₂SC₁₁H₂₃)₃
|
CH₂
|
O
|
CH₂
|
C(CH₂OCH₂CH₂CH₂SC₁₁H₂₃)₃

C(CH₂OCH₂CHCH₂SC₁₈H₃₇)₃
|      |
CH₂    CH₃
|
O
|
CH₂
|
C(CH₂OCH₂CHCH₂SC₁₈H₃₇)₃
              |
              CH₃

C(CH₂OCH₂CHCH₂SC₁₅H₃₁)₃
|      |
CH₂    CH₃
|
O
|
CH₂
|
C(CH₂OCH₂CHCH₂SC₁₅H₃₁)₃
              |
              CH₃

C—(CH₂OCH₂CH₂CH₂SC₁₆H₃₃)₂
|
CH₂  CH₂OCH₂CH₂CH₂SC₁₂H₂₅
|
O
|
CH₂
|
C(CH₂OCH₂CH₂CH₂SC₁₂H₂₅)₃

C(CH₂OCH₂CH₂CHSC₁₂H₂₅)₃
|           |
CH₂         CH₃
|
O
|
CH₂
|
C(CH₂OCH₂CH₂CHSC₁₂H₂₅)₃
                |
                CH₃

C—CH₂OCH₂CH₂SC₁₃H₂₇
|
CH₂  (CH₂OCH₂CH₂CH₂SC₁₈H₃₇)₂
|
O
|
CH₂
|
C—CH₂OCH₂CH₂CH₂SC₁₃H₂₇
    (CH₂OCH₂CH₂CH₂SC₁₈H₃₇)₂

C(CH₂OCH₂CH₂CHSC₂₀H₄₁)₃
|           |
CH₂         CH₃
|
O
|
CH₂
|
C(CH₂OCH₂CHCH₂SC₁₇H₃₅)₃
              |
              CH₃

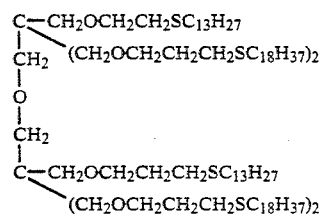

CH₃
        |
C—(CH₂OCH₂CH₂CHSC₈H₁₇)₃
|
CH₂
|
O
|
CH₂
|
C—CH₂OCH₂CH₂CH₂S—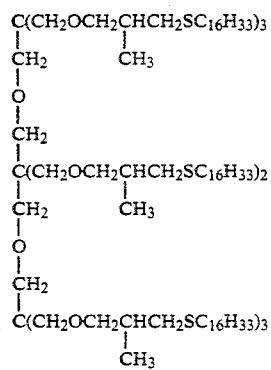
|
(CH₂OCH₂CH₂CH₂SC₁₃H₂₇)₂

C(CH₂OCH₂CHCH₂SC₁₆H₃₃)₃
|       |
CH₂     CH₃
|
O
|
CH₂
|
C(CH₂OCH₂CHCH₂SC₁₆H₃₃)₂
|       |
CH₂     CH₃
|
O
|
CH₂
|
C(CH₂OCH₂CHCH₂SC₁₆H₃₃)₃
              |
              CH₃

-continued

C(CH₂OCH₂CH₂CH₂SC₁₃H₂₇)₃
|
CH₂
|
O
|
CH₂
|
C(CH₂OCH₂CH₂CH₂SC₁₃H₂₇)₂
|
CH₂
|
O
|
CH₂
|
C(CH₂OCH₂CH₂S(C₁₃H₂₇)₃

C(CH₂OCH₂CHCH₂SC₁₅H₃₁)₃
|          |
CH₂       CH₃
|
O
|
CH₂
|
C(CH₂OCH₂CHCH₂SC₁₅H₃₁)₂
|          |
CH₂       CH₃
|
O
|
CH₂
|
C(CH₂OCH₂CHCH₂SC₁₅H₃₁)₃
           |
           CH₃

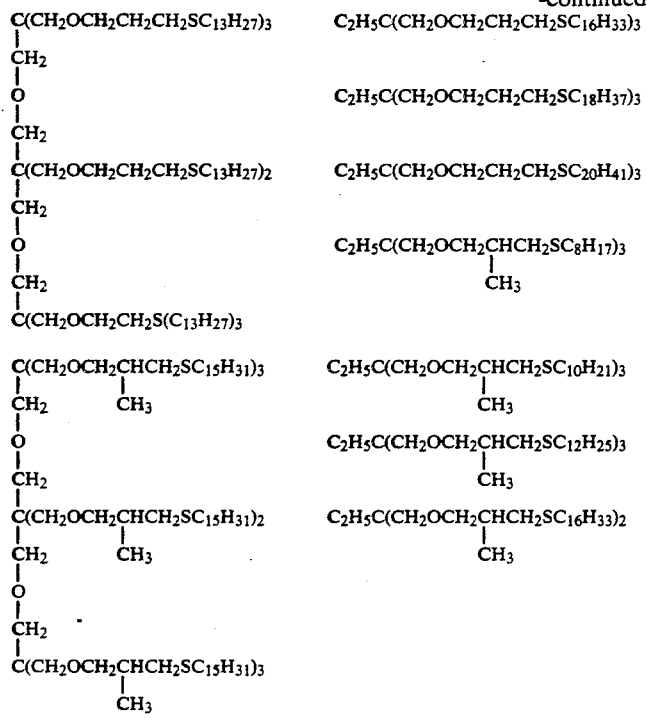

C₂H₅C(CH₂OCH₂CH₂CH₂SC₁₆H₃₃)₃

C₂H₅C(CH₂OCH₂CH₂CH₂SC₁₈H₃₇)₃

C₂H₅C(CH₂OCH₂CH₂CH₂SC₂₀H₄₁)₃

C₂H₅C(CH₂OCH₂CHCH₂SC₈H₁₇)₃
                |
                CH₃

C₂H₅C(CH₂OCH₂CHCH₂SC₁₀H₂₁)₃
                |
                CH₃

C₂H₅C(CH₂OCH₂CHCH₂SC₁₂H₂₅)₃
                |
                CH₃

C₂H₅C(CH₂OCH₂CHCH₂SC₁₆H₃₃)₂
                |
                CH₃

C₂H₅C(CH₂OCH₂CHCH₂SC₁₃H₂₇)₃
                |
                CH₃

C₂H₅C(CH₂OCH₂CHCH₂SC₁₈H₃₇)₃
                |
                CH₃

C₂H₅C(CH₂OCH₂CH₂CHSC₁₂H₂₅)₃
                    |
                    CH₃

C₂H₅—C(CH₂OCH₂CH₂CHSC₉H₁₉)₃
                  |
                  CH₃

C₂H₅—C(CH₂OCH₂CH₂CH₂SC₈H₁₇)₃

C₂H₅C(CH₂OCH₂CH₂CH₂SC₉H₁₉)₃

C₂H₅C(CH₂OCH₂CH₂CH₂SC₁₀H₂₁)₃

C₂H₅C(CH₂OCH₂CH₂CH₂SC₁₃H₂₇)₃

C₂H₅C(CH₂OCH₂CH₂CH₂SC₁₄H₂₉)₃

CH₃C(CH₂OCH₂CH₂CH₂SC₁₀H₂₁)₃
CH₃C(CH₂OCH₂CH₂CH₂SC₈H₁₇)₃
CH₃C(CH₂OCH₂CH₂CH₂SC₉H₁₉)₃

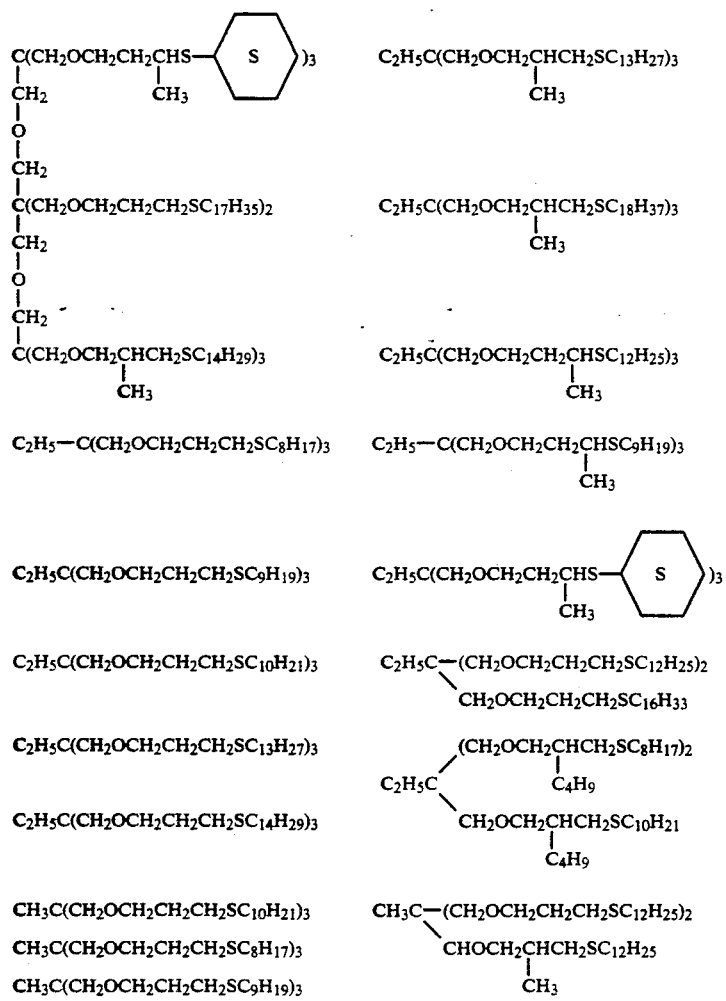

-continued

CH₃C(CH₂OCH₂CH₂CH₂SC₁₁H₂₃)₃

CH₃C(CH₂OCH₂CH₂CH₂SC₁₂H₂₅)₃

CH₃C(CH₂OCH₂CH₂CH₂SC₁₃H₂₇)₃

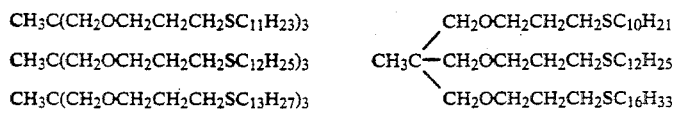

CH₃C(CH₂OCH₂CH₂CH₂SC₁₄H₂₉)₃

CH₃C(CH₂OCH₂CH₂CH₂SC₁₆H₃₃)₃

CH₃C(CH₂OCH₂CHCH₂SC₁₂H₂₅)₃
              |
              C₃H₇

CH₃C(CH₂OCH₂CH₂CH₂SC₁₈H₃₇)₃

CH₃C(CH₂OCH₂CH₂CH₂SC₁₉H₃₉)₃

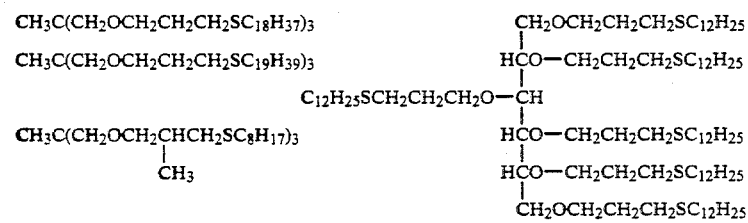

CH₃C(CH₂OCH₂CHCH₂SC₈H₁₇)₃
      |
      CH₃

O(CH₂CH₂CH₂SC₈H₁₇)₂

O(CH₂CHCH₂SC₁₀H₂₁)₂
 |
 CH₃

O(CH₂CH₂CH₂SC₁₂H₂₅)₂

O(CH₂CHCH₂SC₁₃H₂₇)₂
 |
 C₂H₅

O(CH₂CH₂CH₂SC₁₆H₃₃)₂

O(CH₂CH₂CHSC₉H₁₉)₂
     |
     CH₃

O(CH₂CH₂CH₂SC₁₈H₃₇)₂

CH₃C(CH₂OCH₂CHCH₂SC₁₀H₂₁)₃
          |
          CH₃

CH₃C(CH₂OCH₂CHCH₂SC₁₂H₂₅)₃
          |
          CH₃

CH₃C(CH₂OCH₂CHCH₂SC₁₆H₃₃)₃
          |
          CH₃

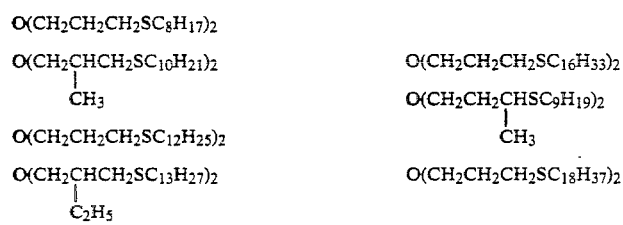

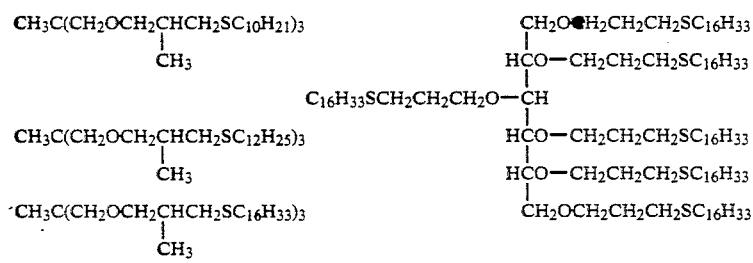

CH₃C(CH₂OCH₂CHCH₂SC₁₈H₃₇)₃
          |
          CH₃

CH₃C(CH₂OCH₂CH₂CHSC₁₂H₂₅)₃
          |
          CH₃

CH₃C(CH₂OCH₂CH₂CHS
          |
          CH₃

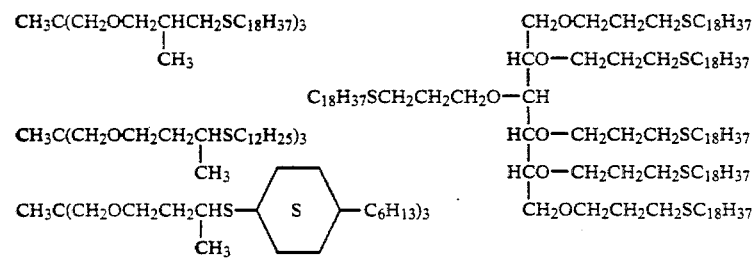

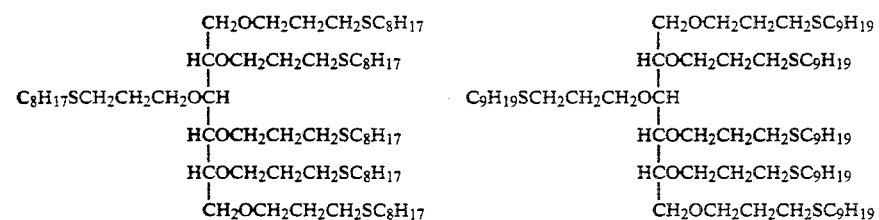

-continued
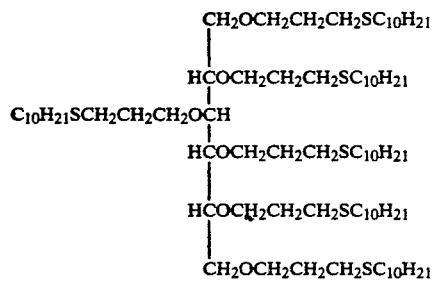
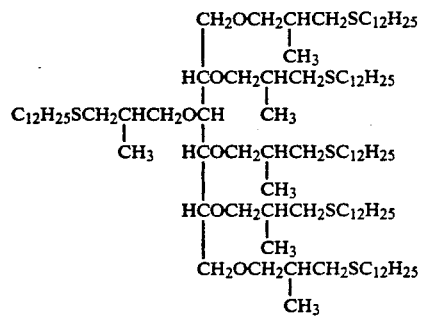
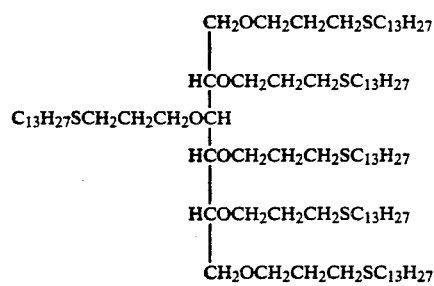
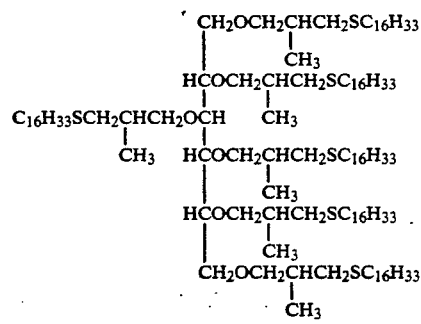
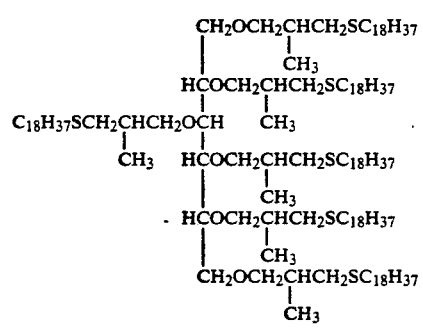
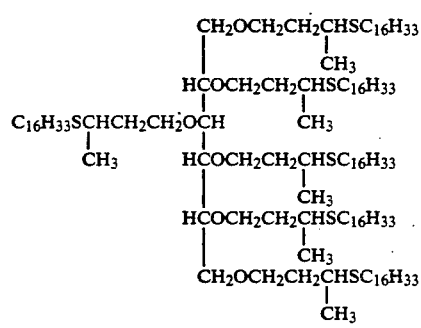
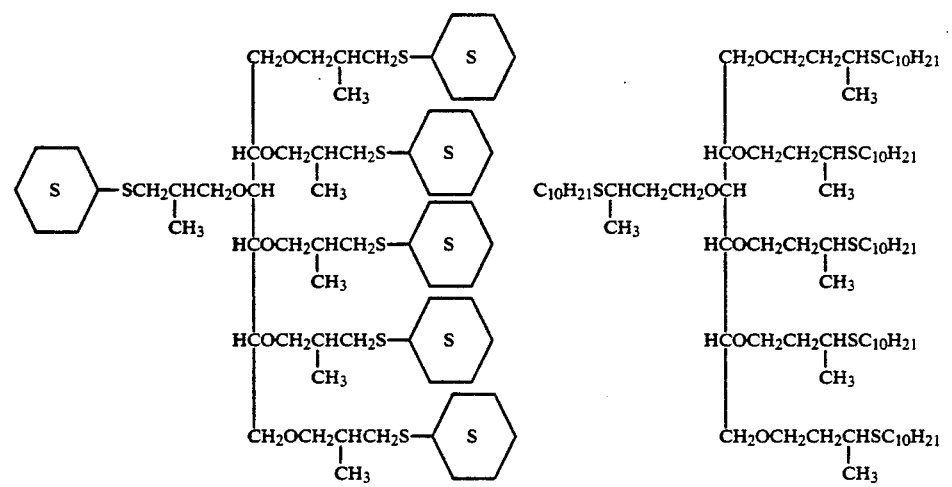

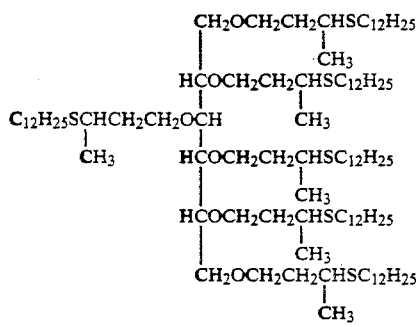
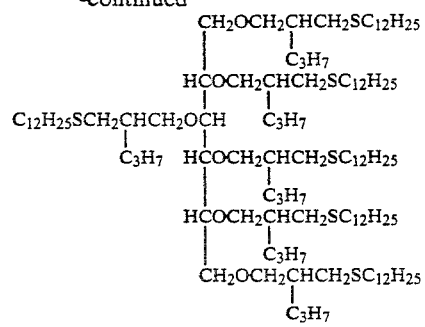

In the following non-limiting examples of representative structures for the organic sulfide antioxidants of the present invention, the sorbitan backbone shown is a 1,4-sorbitan, which comprises approximately 85% of the sorbitan conventionally used. Sorbitan also contains approximately 13% of 3,6-sorbitan and about 2% of 2,5-anhydro-L-iditol (both isomers of 1,4-sorbitan). Accordingly it will be understood by one skilled in the art that the organic sulfide antioxidants set forth below, which are derived from 1,4-sorbitan, also include those derived from 3,6-sorbitan and 2,5-anhydro-L-iditol.

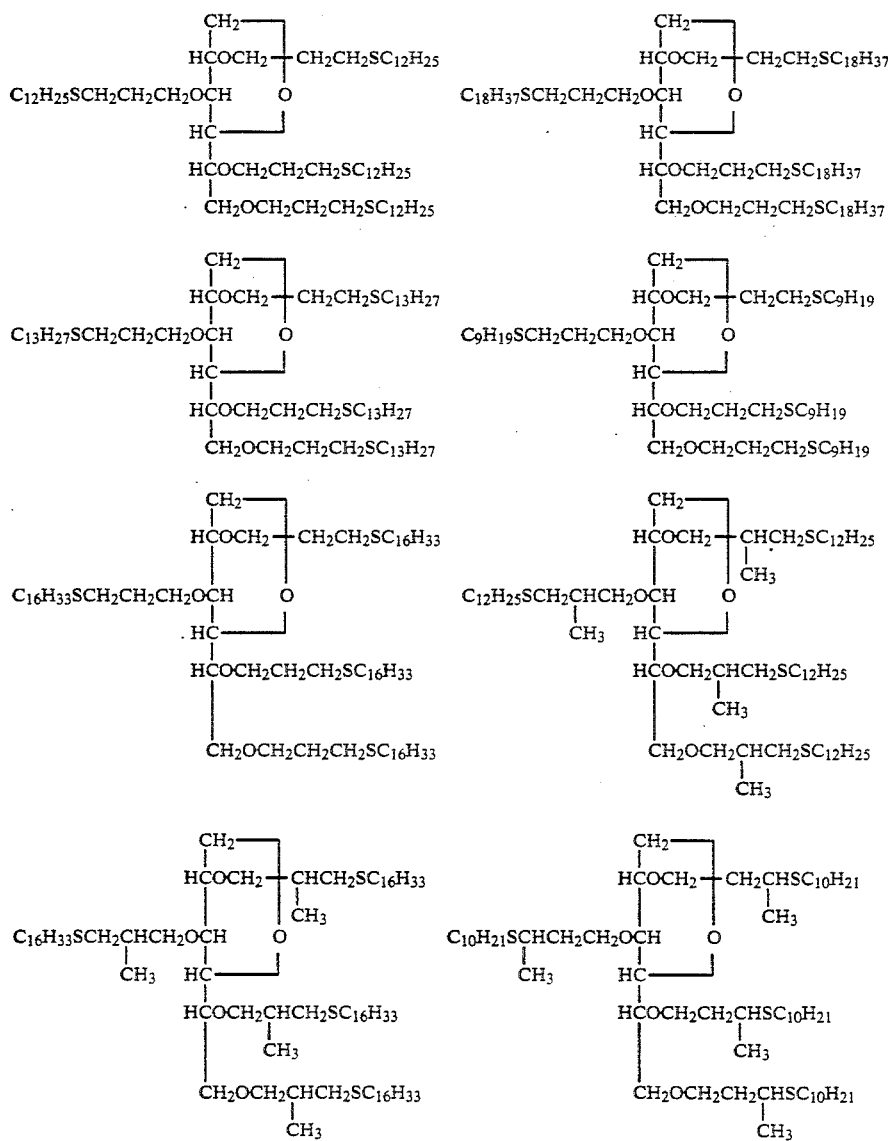

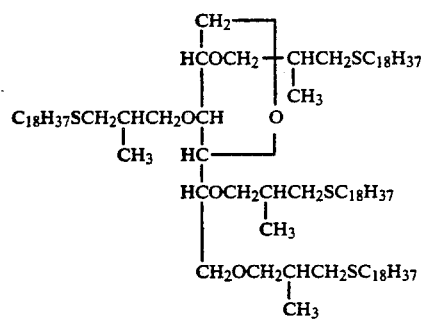
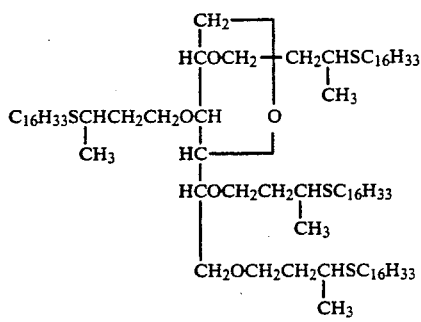
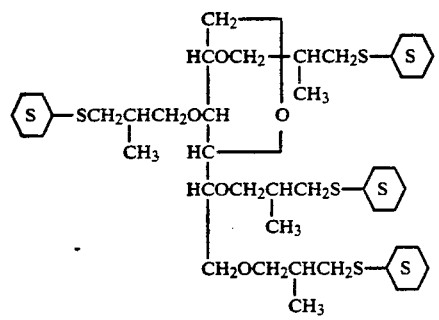
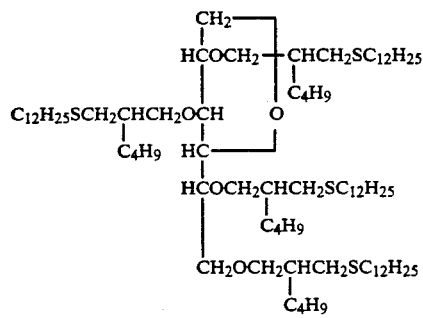
In the following non-limiting examples of representative organic sulfide antioxidants useful in the present invention which are derived from sucrose,
Z is $CH_2CH_2CH_2SR^3$; $Z^1$ is
$$CH_2CHCH_2SR^3;$$
$$\quad |$$
$$\quad CH_3$$
$Z^2$ is
$$CH_2CH_2CHSR^3;$$
$$\qquad\quad |$$
$$\qquad\quad CH_3$$
and $R^3$ is as defined above.
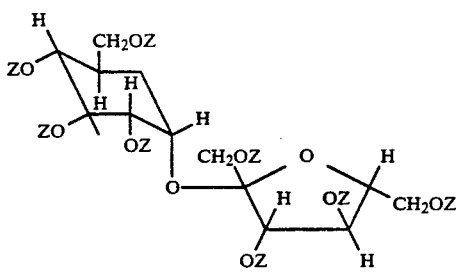
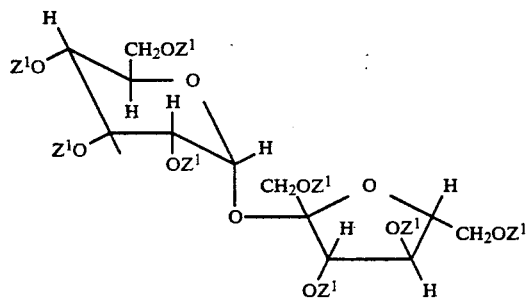

-continued
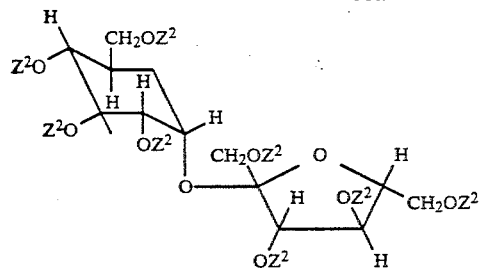
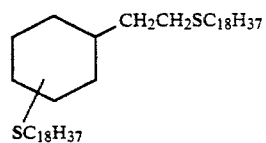 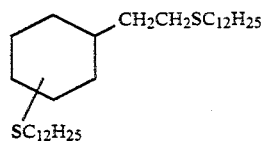
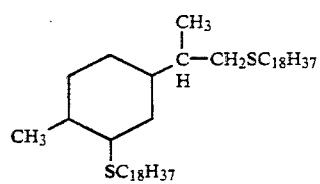 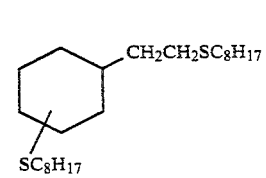
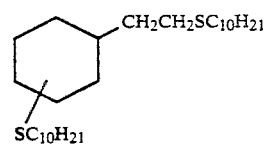 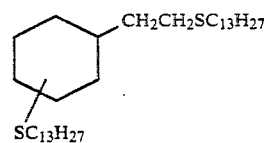
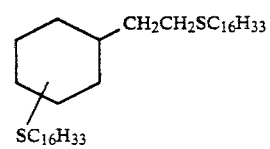 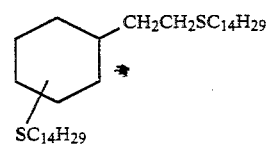
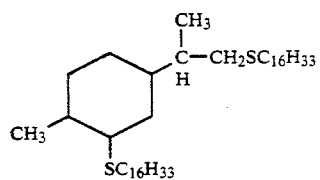 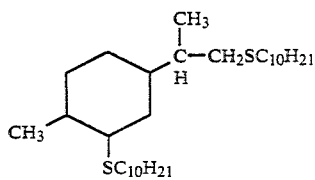
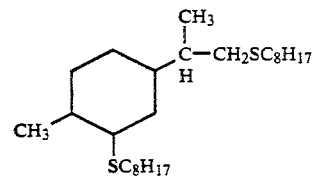 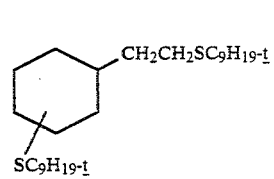
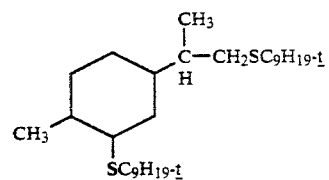 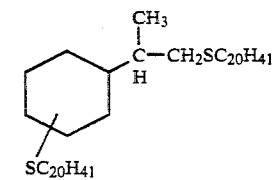
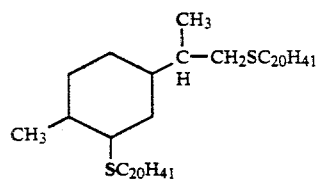 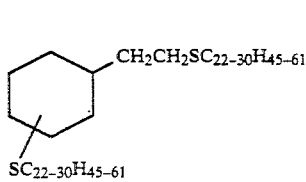

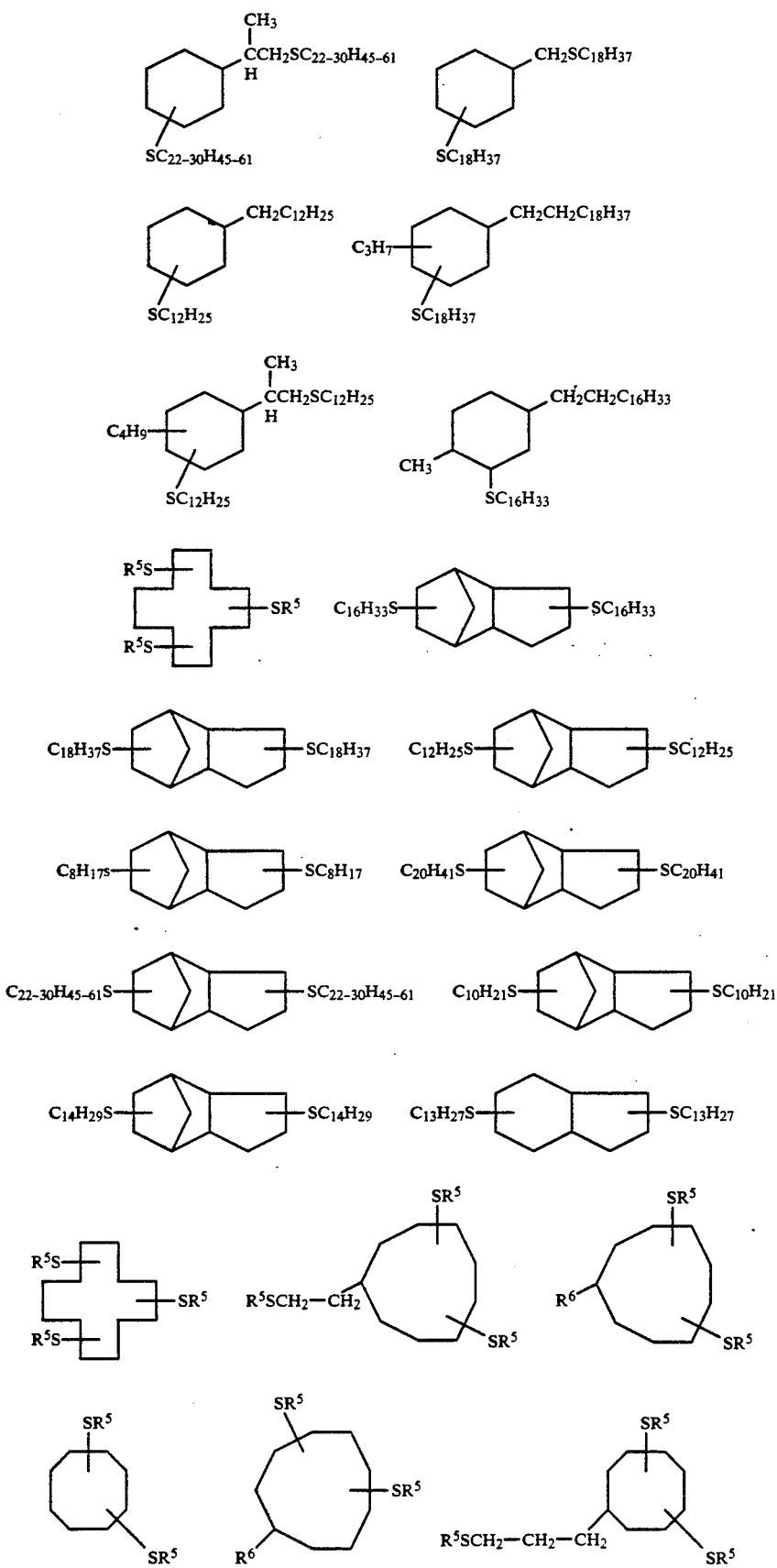

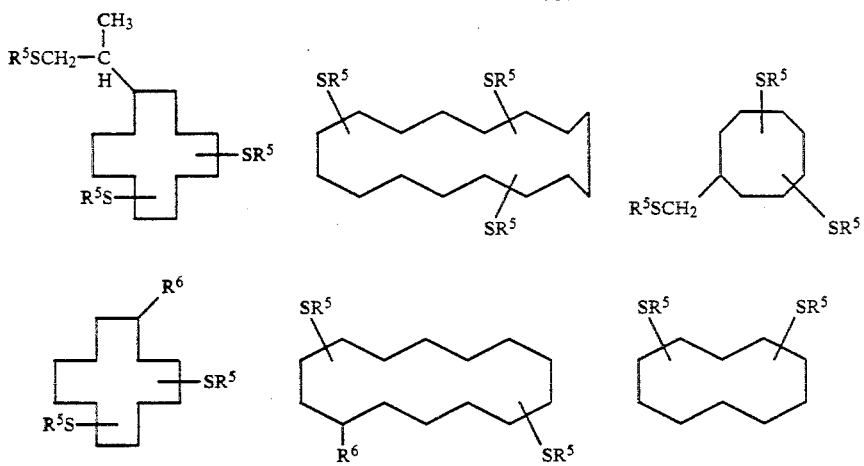
$R^5$ in the formulas set forth above represents an alkyl group of 8 to 24 carbon atoms and $R^6$ represents an alkyl group of 1 to 7 carbon atoms.
Non-limiting examples of preferred organic sulfide antioxidants useful in the present invention include, e.g.,
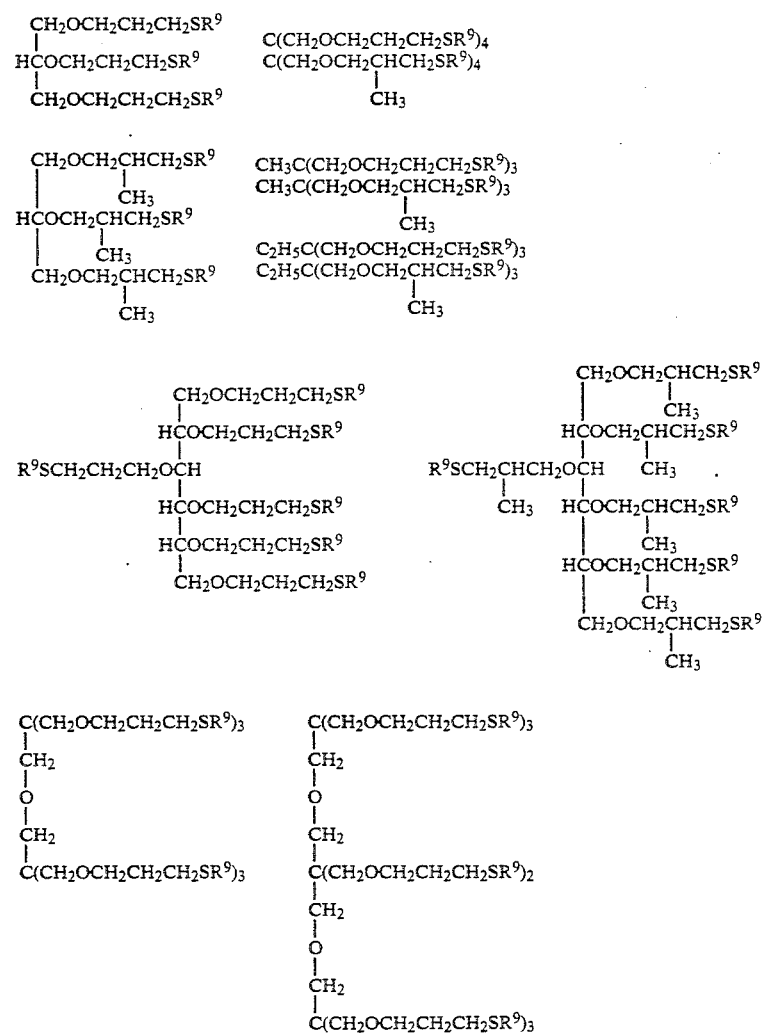

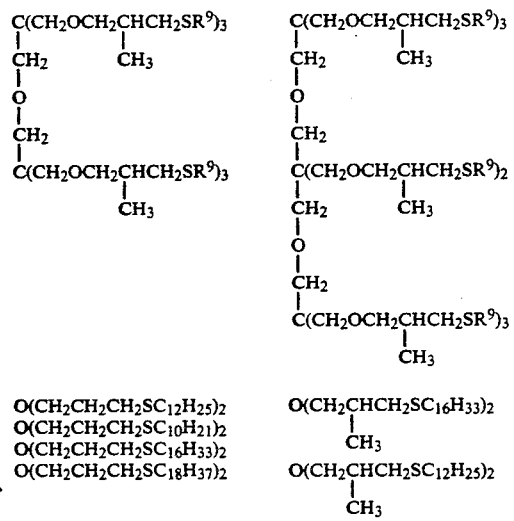
O(CH₂CH₂CH₂SC₁₂H₂₅)₂
O(CH₂CH₂CH₂SC₁₀H₂₁)₂
O(CH₂CH₂CH₂SC₁₆H₃₃)₂
O(CH₂CH₂CH₂SC₁₈H₃₇)₂
O(CH₂CHCH₂SC₁₆H₃₃)₂
     |
     CH₃
O(CH₂CHCH₂SC₁₂H₂₅)₂
     |
     CH₃
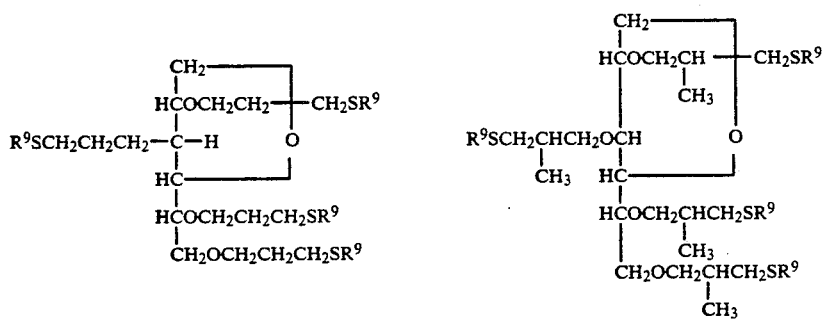
(plus other isomers of sorbitan)
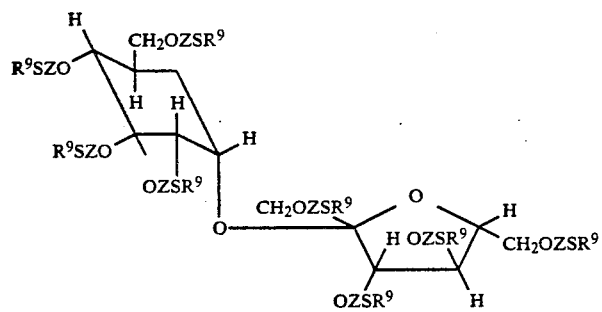
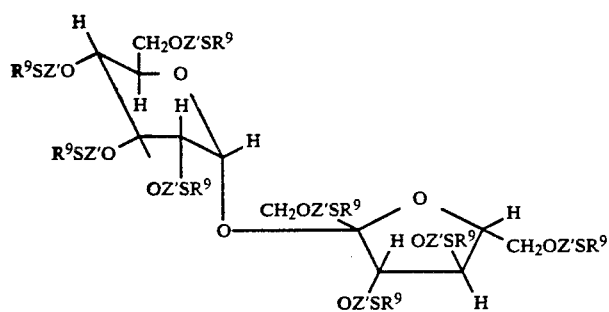
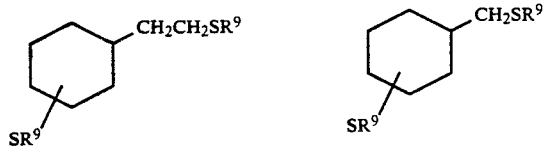

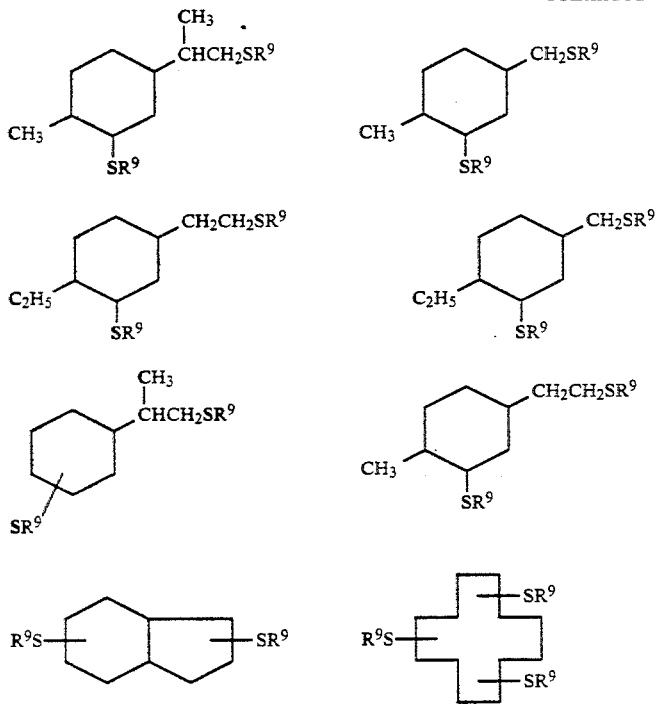

wherein $R^9$ represents an alkyl group of 10–18 carbons; $R^6$ is —H, —CH$_3$ or —C$_2$H$_5$ and Z; and Z' are as defined above.

Non-limiting examples of the most preferred organic sulfide antioxidants useful in the compositions of the present invention include, e.g.,

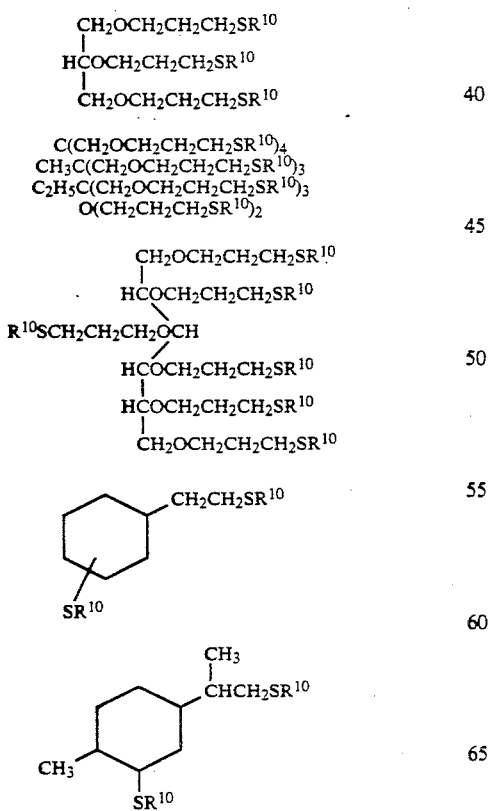

wherein $R^{10}$ represents an alkyl group of 12–18 carbons.

Compounds of Formula I may be prepared, e.g., by first reacting a polyol (with two or more hydroxyl groups per molecule) with an allylic or substituted allylic halide (chloride, bromide, or iodide) in the presence of a base, such as sodium or potassium hydroxide, for example. The amount of base used should be an amount sufficient to remove by-product hydrogen halide and to form the corresponding polyallylic ether. Water or an inert solvent may be used if necessary to facilitate the separation of the by-product metal halide from the polyallylic ether.

Next, a mercaptan is added to the resultant polyallylic ether of the above reaction, under free radical conditions (i.e., in the presence of peroxides, azo compounds, ultra-violet light, etc.), in order to form the antioxidant compounds of this invention. The number of moles of mercaptan employed in this reaction is an amount at least equal to the number of double bonds in the polyallylic ether.

Compounds of Formula II and III may be prepared by adding a mercaptan to either a diallyl ether or an olefin, respectively, by the method described above for compounds represented by Formula I. Other appropriate methods for preparing compounds represented by Formula I, II or III of the present invention and will be apparent to one skilled in the art based upon the present disclosure.

Non-limiting examples of preferred organic sulfide antioxidants useful in the present compositions include 2,9-bis(octadecylthio)-p-menthane; beta(alkylthio)ethyl-3-(alkylthio)cyclohexane; beta(alkylthio)ethyl-4-(alkylthio)cyclohexane; beta(n-octadecylthio)ethyl-3-(n-octadecylthio)cyclohexane, beta(n-octadecylthio)ethyl-4-(n-octadecylthio)cyclohexane, which are all usually prepared as a mixture of isomers and referred to hereinafter as "beta(alkylthio)ethyl-3 and 4-(alkylthio)cyclohexane", and equivalent terms; 1,5,9-tris(hexadecylthio)cyclododecane, 1,5,8-tris(hexadecylthio)cyclododecane, 1,4,8-tris(hexadecylthio)cyclododecane, which are usually prepared as a mixture of isomers and referred to hereinafter as "1,4(or 5),8(or 9)-tris(hexadecylthio)cyclododecane", and equivalent terms; 2,9-bis(alkylthio)-p-menthane; 3,3'-bis (alkylthiopropyl) ether; 1,4,8-tris(alkylthio)cyclododecane; 1,5,8-tris(alkylthio)-cyclododecane and 1,5,9-tris(alkylthio)cyclododecane, which are all usually prepared as a mixture of isomers and referred to hereinafter as "1,4(or 5),8(or 9)-tris(alkylthio)cyclododecane" and equivalent terms; pentaerythritol tetrakis(n-octadecylthiopropyl) ether; pentaerythritol tris(n-octadecylthiopropyl) ether; pentaerythritol tetrakis(n-dodecylthiopropyl) ether; pentaerythritol tris(n-dodecylthiopropyl) ether; trimethylolpropane tris(n-octadecylthiopropyl) ether; trimethylolpropane tris(n-hexyldecylthiopropyl) ether; dipentaerythritol hexakis(n-octylthiopropyl) ether; dipentaerythritol hexakis(n-dodecylthiopropyl) ether dipentaerythritol hexakis(n-hexadecylthiopropyl) ether. The alkylthio group in each of the above classes of compounds contains about 2 to about 38 carbons and preferably, about 8 to about 20 carbons.

Polyolefin resins which may be crosslinked with peroxide crosslinked inducing agents or high energy radiation and stabilized with the organic sulfide antioxidants of the present invention include, e.g., linear low density polyethylenes, low density polyethylenes, high density polyethylenes, ethylene-propylene copolymers, ethylene-vinyl acetate copolymers, ethyleneacrylate ester copolymers, chlorosulfonated polyethylenes, polypropylenes, polybutene-1, polyisobutylenes, poly-4-methylpentene-1, poly-methylbutene-1, poly-4,4-dimethylpentene-1, polydecene-1, polydodecene-1, ethylene-propylene-butadiene terpolymers, ethylene-propylene-dicyclopentadiene terpolymers, polybutadiene, ethylene-propylenenorbornadiene terpolymers, cis-1,4-polyisoprenes, styrene-butadiene copolymers, silicone rubbers, and mixtures thereof.

Preferred polyolefins resins useful in the present invention are those which contain ethylenes, such as low density polyethylenes, linear low density polyethylene and high density polyethylenes, ethylene-propylene copolymers, ethylene-vinyl acetate, ethylene-acrylate ester copolymers, ethylene-propylene-butadiene terpolymers, ethylene-propylene-dicylopentadiene terpolymers, ethylene-propylene-norbornadiene terpolymers, chlorosulfonated polyethylene and blends thereof.

The polyolefin resins useful in the present invention may be crosslinked through the addition of peroxide crosslinking agents or by high doses of high energy radiation.

The appropriate peroxide crosslinking agents which may be used in the compositions of the present invention are any of those peroxide crosslinking agents which are compatible with the organic sulfide antioxidants used in a particular composition according to the present invention.

Exemplary of the peroxide crosslinking agents useful in the present composition are di-t-butyl peroxide, dicumyl peroxide, benzoyl peroxide, t-butyl cumyl peroxide, 2,5-dimethyl-2,5-di(t-butylperoxy)hexyne-3, 2-5-dimethyl-2,5-di(t-butylperoxy)hexane,$\alpha,\alpha$-bis(t-butylperoxy)diisopropylbenzene, n-butyl-4,4-bis(t-butylperoxy) valerate, 1,1-di(t-butyl-peroxy)-3,3,5-trimethylcyclohexane, 1,1-di(t-butylperoxy)cyclohexane, ethyl-3,3-di(t-butyl-peroxy)butyrate, 2,2-di(t-amylperoxy) propane, ethyl-3,3 -di(t-amylperoxy) butyrate, as well as t-alkyl, alkylcarbonate and benzoate diperoxy derivatives of 3-hexyne, 4-octyne, and 3,5-octadiyne. The use of additional peroxide crosslinking agents will be evident to one skilled in the art based on the present disclosure.

Moreover, the polyolefin resins useful in the present compositions may be crosslinked by subjecting the composition to the appropriate dose of high energy radiation, such as electron beam radiation, gamma radiation, ultraviolet radiation, microwave radiation, etc. Other types of high energy radiation which may be useful to crosslink the polyolefin resin compositions of the present invention will be evident to one of ordinary skill in the art based upon the present disclosure.

The compositions of the present invention may further comprise auxiliary antioxidants in synergistic combination with the organic sulfide antioxidants. For example, phosphite, phenolic and arylamine antioxidants may be added to the present compositions in order to provide enhanced antioxidant and stabilizing effects.

Moreover, additives, such as talc, metal deactivators, calcium carbonate, calcium stearate, UV stabilizers (e.g., benzophenes, salicylic acid esters, hindered amines and benzotriazoles), etc., may also optionally be included in the compositions of the present invention. Other additives which may be included in the present compositions will be evident to one of ordinary skill in the art based upon the present disclosure.

In the compositions according to the present invention, the organic sulfide antioxidants are contained in a weight ratio of about 1:10,000 to about 1:20, and preferably about 1:2,000 to about 7:1,000 (organic sulfide antioxidant to polyolefin resin). If used, the auxiliary antioxidant may be contained in the present compositions in a weight ratio of about 10:1 to 1:10 and preferably, about 1:2 to about 1:4 (auxiliary antioxidant to organic sulfide antioxidant). The weight ratio of the peroxide crosslinking agent to the organic sulfide antioxidant is from about 100:1 to about 1:100 and preferably, about 50:1 to about 5:1.

The present compositions may be prepared in any manner generally known to those skilled in the art. For example, the polyolefin resins may be crosslinked with either peroxide cross inking agents or high energy radiation. The organic sulfide antioxidants may be added to the polyolefin resins prior to crosslinking in any conventional manner, such as by blending, extruding, kneading, etc., known in the art in order to produce compositions which are uniform in their constitution.

If an auxiliary antioxidant, such as a known phenolic antioxidant or arylamine antioxidant, is to be added to the polyolefin resin, it will be added at the same time as the organic sulfide antioxidant. Other additives, such as talc, metal deactivators, calcium carbonate, calcium stearate, etc., may also be added to the composition at this point.

Although the method for the preparation of the present compositions is not limited, generally, the peroxide crosslinking agent, if used, is added to the polymeric resin after the addition of the other ingredients. Likewise, if the resin is to be crosslinked with a high energy radiation, the resin will be subjected to the high energy radiation after the addition of the ingredients. Other appropriate methods for preparing the present compositions will be evident to one skilled in the art based upon the present disclosure.

The present invention will now be illustrated in more detail by reference to the following examples.

EXAMPLES 1-6

In the following examples, the improvement in the oxidative and thermal stability of crosslinked low density polyethylene due to presence of the organic sulfide antioxidants of this invention are demonstrated.

The compositions were prepared in the following manner. The bowl of a Brabender Torque Rheometer was preheated to 125° C. and the mixing blades were set to rotate at 50 to 60 rpm. The resin was added first and maintained at 125° C. until it fluxed (approximately five minutes). The organic sulfide antioxidant and the auxiliary phenolic antioxidant, as well as the calcium stearate additive, were then added to the resin simultaneously and mixed for an additional five minutes. The dicumyl peroxide crosslinking agent was then added to the mixture. This resulting mixture was further mixed for an additional five minutes for a total mixing time of 15 minutes. During this period, the bowl temperature was maintained at a temperature of no higher than 145° C.

The resultant polymer blends were then pressed into plaques in a cold press for three minutes at 30,000 psi. These plaques were then crosslinked by placing them into a heated Carver Press for five minutes at 120° C. and 150 psi. The pressure was then raised to 20,000 psi for two minutes and the temperature was raised to 175° C. This temperature and pressure were maintained for 15 minutes. The plaques were then cut into Tensile Bars in accordance with ASTM Procedure No. 4. The tensile bars were suspended in-a forced air oven at 150° C.

Every seven days, the samples were removed from the oven for a determination of the tensile strength and percent elongation according to the ASTM D638 test procedure. The tests were continued for 21 days or until either the tensile strength or percent elongation of the specimens reached 50% of its original value, at which time the samples were considered to have "failed". In the Tables below the "% Tensile Strength" is defined as follows:

$$\frac{(\text{Tensile Strength})_x}{(\text{Tensile Strength})_o} \times 100$$

wherein (Tensile Strength)$_x$ is the tensile strength of the sample after "x" days in the 150° C. oven and (Tensile Strength)$_o$ is the initial tensile strength before the samples were oven-aged (i.e., day zero).

In a similar manner, the "% (% Elongation)" is defined as follows:

$$\frac{(\% \text{ Elongation})_x}{(\% \text{ Elongation})_o} \times 100$$

wherein (% Elongation)$_x$ is the % elongation of the sample after "x" days in the 150° C. oven and (% Elongation)$_o$ is the initial % elongation before the samples were oven-aged (i.e., day zero).

In Examples 1 to 6, the following materials were used:
LDPE - Low Density Polyethylene
CaSt - Calcium Stearate
PAO-1 - Phenolic Antioxidant
PAO-2 - Phenolic Antioxidant
OTEOTC - beta-(octadecylthio)ethyl-3(4)-octadecylthiocyclohexane
DSTDP - Distearyl Thiodipropionate
DICUP - Dicumyl Peroxide
MD - Metal Deactivator The results set forth in Table I demonstrate the improved oxidative and thermal stability of the crosslinked low density polyethylene compositions containing the organic sulfide antioxidants of the present invention as compared to those containing the conventional sulfide antioxidant, DSTDP, regardless of which primary phenolic antioxidant was used.

A comparison of Example 1 vs. Example 2 and Example 3 vs. Example 4 demonstrate that the compositions containing the compounds of the instant invention, OTEOTC, did not fail until 21 days of oven-aging. In contrast, corresponding compositions containing the conventional sulfide antioxidant failed after 14 days. In addition, in a comparison of Example 5 vs. Example 6, wherein both the compositions containing DSTDP and OTEOTC failed after 21 days, the composition containing the present antioxidant (Example 6) failed only the % (% Elongation), whereas the corresponding DSTDP composition (Example 5) failed both the % Tensile Strength and the % (% Elongation) tests.

TABLE I

| Example No. | 1 | 2 | 3 | 4 | 5 | 6 |
|---|---|---|---|---|---|---|
| LDPE[a] | 98.55 | 98.55 | 97.8 | 97.8 | 98.55 | 98.55 |
| PAO-1[b] | 0.2 | 0.2 | | | | |
| PAO-2[c] | | | 0.2 | 0.2 | 0.2 | 0.2 |
| CaSt | 0.1 | 0.1 | 0.1 | 0.1 | 0.1 | 0.1 |
| DSTDP | 0.4 | | 0.4 | | 0.4 | |
| OTEOTC | | 0.4 | | 0.4 | | 0.4 |
| DICUP[d] | 0.75 | 0.75 | 1.5 | 1.5 | 0.75 | 0.75 |
| 0 Days | | | | | | |
| Tensile Strength (psi)[e] | 2740 | 2340 | 1460 | 1350 | 2580 | 1980 |
| % Elongation | 1060 | 896 | 492 | 428 | 1146 | 784 |
| 7 Days | | | | | | |

TABLE I-continued

| Example No. | 1 | 2 | 3 | 4 | 5 | 6 |
|---|---|---|---|---|---|---|
| Tensile Strength (psi)[e] | 1740 | 2610 | 2340 | 2080 | 2730 | 2870 |
| % Tensile Strength | 78 | 112 | 160 | 154 | 106 | 210 |
| % Elongation | 614 | 1010 | 724 | 684 | 1110 | 1152 |
| % (% Elongation) | 58 | 113 | 148 | 160 | 97 | 147 |
| 14 Days | | | | | | |
| Tensile Strength (psi)[e] | 690 | 1830 | 840 | 1250 | 1580 | 2250 |
| % Tensile Strength | Failed | 78 | 58 | 93 | 61 | 114 |
| % Elongation | 31 | 629 | 71 | 234 | 612 | 920 |
| % (% Elongation) | Failed | 70 | Failed | 55 | 53 | 117 |
| 21 Days | | | | | | |
| Tensile Strength (psi)[e] | — | 950 | — | 870 | 520 | 990 |
| % Tensile Strength | — | Failed | — | 65 | Failed | 61 |
| % Elongation | — | 41 | — | 61 | 48 | 50 |
| % (% Elongation) | — | Failed | — | Failed | Failed | Failed |

[a] Union Carbide Corp.'s DYNA ®-1.
[b] Ciba-Geigy's Irganox ® 1010.
[c] Ciba-Geigy's Irganox ® 1035.
[d] Lucidol Division of Pennwalt Corp.'s Lupersol ® 500R.
[e] At break.

EXAMPLES 7-18

In Examples 7-18, the improvement in the oxidative and thermal stability of crosslinked, low density polyethylene containing a metal deactivator through the incorporation of the compounds of the present invention are demonstrated.

The preparation of Examples 7-18 is the same as that described for Examples 1-6 above In addition, a metal deactivator was added to the mixture simultaneously with the antioxidants and calcium stearate.

The results set forth in Table II further demonstrate the improved oxidative and thermal stability of the crosslinked low density polyethylene compositions containing the organic sulfide antioxidants of the present invention as compared to those containing conventional sulfide antioxidants, i.e., DSTDP.

A comparison of Example 7 vs. Example 8 and Example 9 vs. Example 10, demonstrates that the compositions according to the instant-invention containing the present organic sulfide antioxidants did not fail until 21 days of oven-aging, while those containing the conventional sulfide antioxidant failed after 14 days.

Moreover, the 14-day sample containing the DSTDP (i.e., Example 9) was discolored. Such discoloration is a drawback in commercial situations wherein color retention is an important consideration.

Although both Examples 11 and 12 (containing DSTDP and OTEOTC, respectively) failed after 21 days, the samples containing the DSTDP were discolored while those containing the antioxidants of the present invention were not. Also, the samples containing the sulfide antioxidant of the instant invention had generally higher % Tensile Strength and %(% Elongation) values.

Example 14 did not fail even after 21 days, in contrast to Example 13 which failed at 21 days.

In Examples 15 through 18, none of the compositions failed at 21 days. However, those containing the compound of this invention (i.e., Examples 16 and 18) had significantly higher % Tensile Strength and % (% Elongation) values.

TABLE II

| Example No. | 7 | 8 | 9 | 10 | 11 | 12 | 13 | 14 | 15 | 16 | 17 | 18 |
|---|---|---|---|---|---|---|---|---|---|---|---|---|
| LDPE[a] | 97.8 | 97.8 | 97.8 | 97.8 | 97.7 | 97.7 | 97.7 | 98.45 | 98.45 | 98.45 | 98.45 | 98.45 |
| PAO-1[b] | 0.2 | 0.2 | | | | | 0.2 | 0.2 | 0.2 | 0.2 | | |
| PAO-2[c] | | | 0.2 | 0.2 | 0.2 | 0.2 | | | | | 0.2 | 0.2 |
| CaSt | 0.1 | 0.1 | 0.1 | 0.1 | 0.1 | 0.1 | 0.1 | 0.1 | 0.1 | 0.1 | 0.1 | 0.1 |
| MD[d] | 0.1 | 0.1 | 0.1 | 0.1 | 0.1 | 0.1 | 0.1 | 0.1 | 0.1 | 0.1 | 0.1 | 0.1 |
| DSTDP | 0.3 | | 0.3 | | 0.4 | | 0.4 | | 0.3 | | 0.4 | |
| OTEOTC | | 0.3 | | 0.3 | | 0.4 | | 0.4 | | 0.3 | | 0.4 |
| DICUP[e] | 1.5 | 1.5 | 1.5 | 1.5 | 1.5 | 1.5 | 1.5 | 1.5 | 0.75 | 0.75 | 0.75 | 0.75 |
| 0 Days | | | | | | | | | | | | |
| Tensile Strength (psi)[f] | 1140 | 1130 | 1060 | 1130 | 1060 | 1030 | 1090 | 1150 | 1110 | 1070 | 1090 | 1090 |
| % Elongation | 182 | 184 | 147 | 196 | 124 | 147 | 130 | 168 | 181 | 162 | 237 | 184 |
| 7 Days | | | | | | | | | | | | |
| Tensile Strength (psi)[f] | 1650 | 2150 | 1810 | 1990 | 1670[f] | 2170 | 2030 | 2160 | 2110 | 2180 | 2200 | 2290 |
| % Tensile Strength | 145 | 190 | 171 | 176 | 158 | 211 | 186 | 188 | 190 | 204 | 202 | 210 |
| % Elongation | 533 | 800 | 712 | 706 | 627 | 777 | 186 | 832 | 950 | 833 | 1036 | 978 |
| % (% Elongation) | 293 | 435 | 484 | 360 | 506 | 529 | 617 | 495 | 525 | 514 | 437 | 532 |
| 14 Days | | | | | | | | | | | | |
| Tensile Strength (psi)[f] | 570 | 1880 | 890[f] | 1020 | 1030 | 1870 | 1270 | 2230 | 2190 | 1970 | 2100 | 1990 |
| % Tensile Strength | 50 | 166 | 81 | 90 | 98 | 177 | 117 | 194 | 198 | 184 | 193 | 183 |
| % Elongation | 44 | 670 | 66 | 144 | 197 | 732 | 290 | 820 | 981 | 778 | 932 | 795 |
| % (% Elongation) | Failed | 364 | Failed | 73 | 159 | 498 | 223 | 488 | 542 | 480 | 393 | 432 |
| 21 Days | | | | | | | | | | | | |
| Tensile Strength (psi)[f] | — | 710 | — | 660 | 660 | 920 | 760 | 1030 | 1000 | 1820 | 1840 | 2010 |
| % Tensile Strength | — | 63 | — | 58 | 62 | 89 | 70 | 90 | 90 | 170 | 169 | 184 |
| % Elongation | — | 40 | — | 30 | 58 | 68 | 55 | 164 | 203 | 648 | 866 | 862 |

TABLE II-continued

| Example No. | 7 | 8 | 9 | 10 | 11 | 12 | 13 | 14 | 15 | 16 | 17 | 18 |
|---|---|---|---|---|---|---|---|---|---|---|---|---|
| % (% Elongation) | — | Failed | — | Failed | Failed | Failed | Failed | 93 | 112 | 400 | 365 | 468 |

[a] Union Carbide's DYNN ®-1.
[b] Ciba-Geigy's Irganox ® 1010.
[c] Ciba-Geigy's Irganox ® 1035.
[d] Ciba-Geigy's MD 1024 ®.
[e] Lucidol Division of Pennwalt Corp's Lupersol ® 500R.
[f] At break.
[g] Sample is discolored

EXAMPLES 19-28

TABLE III

| Example No. | 19 | 20 | 21 | 22 | 23 | 24 | 25 | 26 | 27 | 28 |
|---|---|---|---|---|---|---|---|---|---|---|
| EVA[a] | 97.0 | 97.0 | 96.75 | 96.75 | 97.0 | 97.0 | 96.5 | 96.5 | 96.75 | 96.75 |
| PAO-1[b] | 0.5 | 0.5 | 0.5 | 0.5 | | | | | | |
| PAO-2[c] | | | | | 0.5 | 0.5 | 0.5 | 0.5 | 0.5 | 0.5 |
| CaSt | 0.5 | 0.5 | 0.5 | 0.5 | 0.5 | 0.5 | 0.5 | 0.5 | 0.5 | 0.5 |
| DSTDP | 0.5 | | 0.75 | | 0.5 | | 1.0 | | 0.75 | |
| OTEOTC | | 0.5 | | 0.75 | | 0.5 | | 1.0 | | 0.75 |
| DICUP[d] | 1.5 | 1.5 | 1.5 | 1.5 | 1.5 | 1.5 | 1.5 | 1.5 | 1.5 | 1.5 |
| 0 Days | | | | | | | | | | |
| Tensile Strength (psi)[e] | 2425 | 1990 | 1871 | 1707 | 2377 | 2115 | 2139 | 1559 | 2366 | 1946 |
| % Elongation | 882 | 752 | 616 | 633 | 1006 | 860 | 871 | 701 | 940 | 862 |
| 7 Days | | | | | | | | | | |
| Tensile Strength (psi)[e] | 378 | 1983 | 2020 | 1869 | 1339 | 2181 | 2839 | 2004 | 3211 | 2947 |
| % Tensile Strength | Failed | 99.7 | 108 | 110 | 56 | 103 | 133 | 129 | 136 | 151 |
| % Elongation | 64 | 722 | 788 | 678 | 512 | 795 | 1089 | 791 | 1239 | 1172 |
| % (% Elongation) | Failed | 96 | 117 | 107 | 51 | 92 | 125 | 113 | 132 | 136 |
| 14 Days | | | | | | | | | | |
| Tensile Strength (psi)[e] | | 785 | 420 | 2550 | 334 | 1330 | 2210 | 1980 | 1840 | 2240 |
| % Tensile Strength | | Failed | Failed | 149 | Failed | 63 | 103 | 127 | 78 | 115 |
| % Elongation | | 205 | 80 | 932 | 51 | 429 | 946 | 754 | 739 | 859 |
| % (% Elongation) | | Failed | Failed | 147 | Failed | 50 | 109 | 108 | 79 | 99 |
| 21 Days | | | | | | | | | | |
| Tensile Strength (psi)[e] | | | | 807 | | 341 | 420 | 1710 | 314 | 839 |
| % Tensile Strength | | | | 47 | | Failed | Failed | 110 | Failed | Failed |
| % Elongation | | | | 279 | | 61 | 81 | 794 | 13 | 302 |
| % (% Elongation) | | | | Failed | | Failed | Failed | 113 | Failed | Failed |

[a] DuPont's Elvex ® 470.
[b] Ciba-Geigy's Irganox ® 1010.
[c] Ciba-Geigy's Irganox ® 1035.
[d] Lucidol Div. of Pennwalt Corp. Lupersol ® 500R.
[e] At break.

In Examples 19-28, improvements are demonstrated in the oxidative and thermal stability of crosslinked ethylene-vinyl acetate (82:18) copolymers (EVA) due to the incorporation therein of the organic sulfide antioxidant compounds of the present invention. The preparation of these compositions is the same as that described for Examples 1-6. The results set forth in Table III clearly demonstrate the improved oxidative and thermal stability of crosslinked ethylene-vinyl acetate copolymers containing the organic sulfide antioxidant compounds of the present invention in comparison to those containing a conventional antioxidant (DSTDP).

In Example 19 vs. Example 20, Examples 21 vs. Example 22, Example 23 vs. Example 24 and Example 25 vs. Example 26, the compositions containing the organic sulfide antioxidant compounds of the instant invention (OTEOTC) (i.e., Examples 20, 22, 24 and 26) outperform those containing a conventional antioxidant (DSTDP) (i.e., Examples 19, 21, 23 and 25). Specifically, the time required for the samples containing the present antioxidants to fail was at least 7 days longer than those containing the DSTDP antioxidant.

Only for Examples 27 and 28 did the composition containing the conventional antioxidant fail at the same time as that containing the present antioxidant (21 days). However, even in this case, the Example containing the organic sulfide antioxidants according to the present invention (i.e., Example 28) had higher % Tensile Strength and % (% Elongation) values than the composition comprising the conventional antioxidant.

EXAMPLES 29-32

The compositions were prepared by the following procedure. The resin was first added to a two-roll mill at 120° C. and milled for 5 minutes until it fluxed. The additives were then added to the resin and milling was continued for an additional 8 minutes, in order to uniformly mix the additives into the resin. The sheet of material was then placed in a Carver Press at a temperature of 185° C. for 8½ minutes at a pressure of 20,000 psi. The resulting plaques were then cut into Tensile Bars in accordance with ASTM Procedure No. 4 and suspended in a forced air oven at 150° C. Samples were then removed at 6 and 8 week intervals and the tensile strength measured according to ASTM Test Procedure D638. The % Tensile Strength was calculated by the method described above.

The following materials were used in Examples 29-32:

THDTCD - 1,5(or 6),9(or 10)-Tris(hexadecylthio)cyclododecane
BOTM - 2,9-Bis(Octadecylthio)-p-methane
TBCP - t-butyl Cumyl Peroxide The data set forth in Table IV clearly demonstrates the improved oxidative and thermal stability of the crosslinked low density polyethylene compositions containing organic sulfide antioxidant the compounds of the present invention compared to those containing a conventional antioxidant.

After six weeks, the % retention of tensile strength was much greater for the compositions according to the present invention compared to the sample containing the conventional antioxidant. This improvement ranged from 11% to 34%. Furthermore, the composition containing the present compounds retained 96% of its original tensile strength, while that containing the conventional antioxidant compound dropped below 50%, the point at which a sample is normally considered to have failed.

TABLE IV

| Example No. | 29 | 30 | 31 | 32 |
|---|---|---|---|---|
| LDPE[a] | 100.0 | 100.0 | 100.0 | 100.0 |
| PAO-2[b] | 0.2 | 0.2 | 0.2 | 0.2 |
| TBCP[c] | 1.5 | 1.5 | 1.5 | 1.5 |
| BOTM | 0.3 | | | |
| THDTCD | | 0.3 | | |
| OTEOTC | | | 0.3 | |
| DSTDP | | | | 0.3 |
| Tensile Strength (psi) (initial) | 2750 | 2520 | 2570 | 2560 |
| % Tensile Strength Retention (6 wks) | 91 | 110 | 98 | 82 |
| % Tensile Strength Retention (8 wks) | | 96 | | <50 |

[a]Union Carbide's DYNH ®-1.
[b]Ciba-Geigy's Irganox ® 1035.
[c]Lucidol Division of Pennwalt Corporation's Lupersol ® 801.

EXAMPLES 33-41

Examples 33-41 further illustrate the greater stabilizing and antioxidizing effect of the organic sulfide antioxidants of the present invention.

Small samples (i.e., 10-25 mg) were heated in platinum boats at a rate 10° C. per minute. The temperature for a weight loss of 5% was then determined. The gas flow (nitrogen or air) was 200 cc per minute into a DuPont Model 9900 Thermogravimetric Analyzer.

The antioxidants used in Examples 33-37 and set forth below, are conventional antioxidants used in the plastics industry.

DLTDP - Dilauryl Thiodipropionate
DSPDPH - Distearyl Pentaerythritol Diphosphite
TBPBPH - Tetrakis(2,4-di-t-butylphenyl)-4,4'-biphenylenediphosphonite
TBPP - Tris(2,5-di-tbutylphenyl)Phosphite
PETAE - A 40:60 mixture of-Pentaerythritol Tetrakis(3-hexadecylthiopropyl) Ether and Pentaerythritol Tris (3-hexadecylthiopropyl) Ether The results set forth in Table V demonstrate the temperature at which a 5% weight loss occurs for a series of antioxidants. Examples 38-41are the sulfide antioxidants according to the present invention. As can be seen from this data, the temperature at which a 5% weight loss occurs is considerably greater for the compounds of the present invention as compared to conventional antioxidants. These results are similar whether conducted in air or nitrogen.

TABLE V

| | Thermogravimetric Analysis | |
|---|---|---|
| | | 5% Weight Loss (°C.) |
| Example No. | Compound | Nitrogen | Air |
| 33 | DSTDP | 271 | 266 |
| 34 | DLTDP | 308 | 259 |

TABLE V-continued

| | Thermogravimetric Analysis | |
|---|---|---|
| | | 5% Weight Loss (°C.) |
| Example No. | Compound | Nitrogen | Air |
| 35 | DSPDPH | 252 | 259 |
| 36 | TBPBPH | 171 | 160 |
| 37 | TBPP | 291 | 280 |
| 38 | OTEOTC | 354 | 315 |
| 39 | BOTM | 340 | 300 |
| 40 | THDTCD | 342 | 312 |
| 41 | PETAE | 359 | 314 |

The present invention may be embodied in other specific forms without departing from the spirit or essential attributes thereof and, accordingly, reference should be made to the appended claims, rather than to the foregoing specification as indicating the scope of the invention.

We claim:

1. A composition comprising a crosslinked polyolefin resin and an amount of organic sulfide antioxidant sufficient to stabilize the resin against thermal or oxidative degradation, wherein the organic sulfide antioxidant is represented by Formula I, II or III:

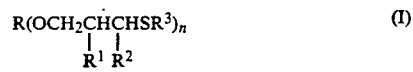

$$R(OCH_2CHCHSR^3)_n \quad (I)$$
$$\quad\quad\quad | \;\; |$$
$$\quad\quad\quad R^1 \; R^2$$

$$O(CH_2CHCHSR^3)_2 \quad (II)$$
$$\quad\quad | \;\; |$$
$$\quad\quad R^1 \; R^2$$

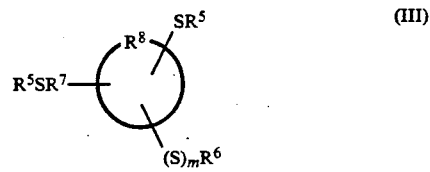

(III)

wherein:
m is 0 or 1;
n is an integer of 2 to 15;
R is a substituted or unsubstituted multivalent alkyl group of 2 to 30 carbons, or a substituted or unsubstituted multivalent cycloalkyl group of 5 to 20 carbons, a substituted or unsubstituted multivalent alkyl group of 2 to 30 carbons where any of up to 6 carbon atoms are replaced with an O or S heteroatom, a substituted or unsubstituted multivalent cycloalkyl group of 5 to 20 carbons where any of up to 6 carbon atoms are replaced with an O heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alkyl group of 1 to 30 carbon or cycloalkyl group of 5 to 20 carbons;
R$^1$ and R$^2$ are independently H or an alkyl group of 1 to 4 carbons;
R$^3$ is an alkyl group of 1 to 24 carbons or a cycloalkyl group of 5 to 20 carbons;
R$^5$ is an alkyl group of 1 to 24 carbons;
R$^6$ is H or an alkyl group of 1 to 24 carbon, with the provisos that when m=0, R$^6$ is H or an alkyl group of 1 to 7 carbons and when m=1, R$^6$ is an alkyl group of 1 to 24 carbons;

R⁷ is a direct bond or an alkylene group of 1 to 4 carbons; and

R⁸ is a monocyclic, bicyclic or tricyclic cycloalkyl group of 5 to 16 carbons.

2. A composition as in claim 1, wherein the organic sulfide antioxidant is represented by Formula I or II, wherein R is:

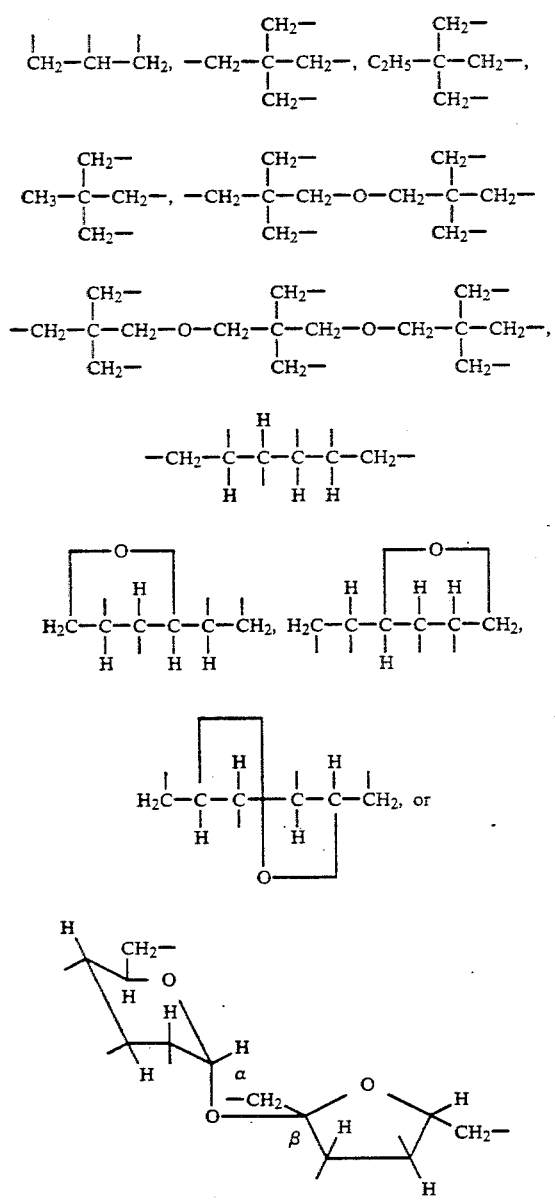

wherein α and β are the types of linkages; and wherein
R¹ is H or —CH₃;
R² is H; and
R³ is an alkyl group of 10 to 18 carbons.

3. A composition as in claim 2, wherein R is:

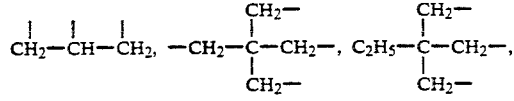

-continued

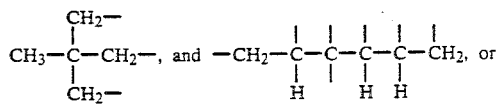

wherein
R¹ and R² are H; and
R³ is an alkyl group of 12 to 18 carbons.

4. A composition as in claim 1, wherein the organic sulfide antioxidant is represented by Formula III and has one of the following structures:

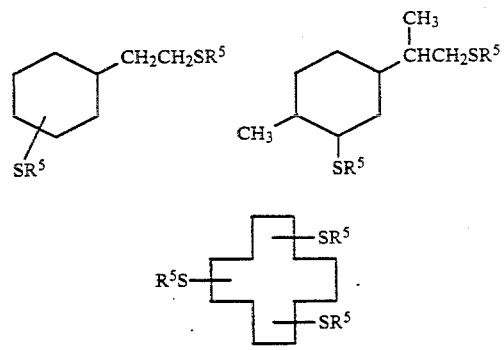

5. A composition as in claim 1, wherein the crosslinked polyolefin resin is at least one of linear low density polyethylenes, low density polyethylenes, high density polyethylenes, ethylene-propylene copolymers, ethylene-vinyl acetate copolymers, ethylene-acrylate ester copolymers, chlorosulfonated polyethylenes, polypropylenes, polybutene-1, polyisobutylene, poly-4-methylpentene-1, poly-methylbutene-1, poly-4,4-dimethyl-pentene-1, polydecene-1, polydodecene-1, ethylene-propylene-butadiene terpolymers, ethylene-propylene-dicyclopentadiene terpolymers, polybutadiene, ethylene-propylene-norbornadiene and copolymers, cis-1,4-polyisoprene, styrene-butadiene copolymers, silicone rubbers, and mixtures thereof.

6. A composition according to claim 1, further comprising a peroxide crosslinking agent.

7. A composition as in claim 6, wherein the peroxide crosslinking agent is di-t-butyl peroxide, di-cumyl peroxide, benzoyl peroxide, t-butyl cumyl peroxide, 2,5-dimethyl-2,5-di(t-butylperoxy)hexyne-3, 2,5-dimethyl-2,5-di(t-butylperoxy)hexyne, α,α-bis(t-butylperoxy)-diisopropylbenzene, n-butyl-4,4-bis(t-butylperoxy) valerate, 1,1-di(t-butyl-peroxy)-3,3,5-trimethylcyclohexane, 1,1-di(t-butylperoxy)cyclohexane, ethyl-3,3-di(t-butyl-peroxy)-butyrate, 2,2-di(t-amylperoxy) propane, ethyl-3,3-di(t-amylperoxy) butyrate or t-alkyl, alkylcarbonate or benzoate diperoxy derivatives of 3-hexyne, 4-octyne, or 3,5-octadiyne.

8. A composition as in claim 1, wherein the composition is crosslinked with high energy radiation.

9. A composition as in claim 1, further comprising an auxiliary antioxidant.

10. A composition as in claim 9, wherein the auxiliary antioxidant is at least one phosphite, phenolic or arylamine antioxidant.

11. A composition as in claim 1, further comprising at least one additive to facilitate processing.

12. A composition as in claim 11, wherein said additive is a metal deactivator, talc, calcium carbonate, calcium stearate or UV stabilizer.

13. A composition as in claim 1, wherein the weight ratio of the organic sulfide antioxidant to the crosslinked polyolefin resin is about 10,000 to about 1:20.

14. A composition as in claim 13, wherein the weight ratio of the sulfide antioxidant to the crosslinked polyolefin resin is about 1:2000 to about 7:1000.

15. A composition as in claim 6, wherein the weight ratio of the peroxide crosslinking agent to the organic sulfide antioxidant is about 100:1 to about 1:100.

16. A composition as in claim 15, wherein the weight ratio of the peroxide crosslinking agent to the organic sulfide antioxidant is about 50:1 to about 5:1.

17. A composition as in claim 9, wherein the weight ratio of the auxiliary antioxidant to the organic sulfide antioxidant is about 10:1 to about 1:10.

18. A composition as in claim 17, wherein the weight ratio of the auxiliary antioxidant to the organic sulfide antioxidant is about 1:2 to about 1:4.

19. A composition as in claim 1, wherein the organic sulfide antioxidant is beta(n-octadecylthio)ethyl-3(4)-n-octadecylthiocyclohexane.

20. A composition as in claim 1, wherein the organic sulfide antioxidant is 1,4(5), 8(9) tris(hexadecylthio)cyclododecane.

21. A composition as in claim 1, wherein the organic sulfide antioxidant is pentaerythritol tetrakis(3-hexadecylthiopropyl)ether.

22. A composition as in claim 1, wherein the organic sulfide antioxidant is pentaerythritol tris(3-hexadecylthiopropyl)ether.

23. A composition as in claim 1, wherein the organic sulfide antioxidant is pentaerythritol tetrakis(n-octadecylthiopropyl) ether.

24. A composition as in claim 1, wherein the organic sulfide antioxidant is pentaerythitol tris(n-octadecylthiopropyl) ether.

25. A composition as in claim 1, wherein the organic sulfide antioxidant is pentaerythritol tetrakis(n-dodecylthiopropyl) ether.

26. A composition as in claim 1, wherein the organic sulfide antioxidant is pentaerythritol tris(n-dodecylthiopropyl) ether.

27. A composition as in claim 1, wherein the organic sulfide antioxidant is trimethylolpropane tris(n-octadecylthiopropyl) ether.

28. A composition as in claim 1, wherein the organic sulfide antioxidant is trimethylolpropane tris(n-hexyldecylthiopropyl) ether.

29. A composition as in claim 1, wherein the organic sulfide antioxidant is dipentaerythritol hexakis(n-octylthiopropyl) ether.

30. A composition as in claim 1, wherein the organic sulfide antioxidant is dipentaerythritol hexakis(n-dodecylthiopropyl) ether.

31. A composition as in claim 1, wherein the organic sulfide antioxidant is dipentaerythritol hexakis(n-hexyldecylthiopropyl) ether.

* * * * *